(12) United States Patent
Newman

(10) Patent No.: US 10,605,932 B1
(45) Date of Patent: Mar. 31, 2020

(54) COMPACT DIRECTIONAL RADIATION DETECTOR SYSTEM

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 47 days.

(21) Appl. No.: 16/377,195

(22) Filed: Apr. 6, 2019

Related U.S. Application Data

(60) Provisional application No. 62/830,356, filed on Apr. 5, 2019, provisional application No. 62/756,060, filed on Nov. 5, 2018, provisional application No. 62/726,295, filed on Sep. 2, 2018, provisional application No. 62/661,072, filed on Apr. 22, 2018.

(51) Int. Cl.
*G01T 1/29* (2006.01)
*G01V 5/00* (2006.01)

(52) U.S. Cl.
CPC ............ *G01T 1/29* (2013.01); *G01V 5/0091* (2013.01)

(58) Field of Classification Search
CPC .......... G01T 3/06; G01T 1/20; G01T 1/2907; G01T 1/29; G01T 1/18; G01T 3/065; G01V 5/0091
See application file for complete search history.

(56) References Cited

U.S. PATENT DOCUMENTS

| | | | |
|---|---|---|---|
| 3,047,721 A | 9/1959 | Folsom | |
| 3,581,090 A | 5/1971 | Brown | |
| 5,345,084 A | 9/1994 | Byrd | |
| 5,665,970 A | 9/1997 | Kronenberg | |
| 5,880,469 A | 3/1999 | Miller | |
| 6,433,335 B1 | 8/2002 | Kronenberg | |
| 6,639,210 B2 | 10/2003 | Odom | |
| 7,312,460 B2 | 12/2007 | Gerl | |
| 7,521,686 B2 | 4/2009 | Stuenkel | |
| 7,655,912 B2 | 2/2010 | Shirakawa | |
| 7,734,447 B2 | 6/2010 | Shirakawa | |
| 7,745,800 B1 | 6/2010 | McGinnis | |
| 7,952,079 B2 | 5/2011 | Neustadter | |
| 7,994,482 B2 | 8/2011 | Frank | |
| 8,030,617 B2 | 10/2011 | Enghardt | |
| 8,067,742 B2 | 11/2011 | Winso | |
| 8,198,600 B2 | 6/2012 | Neustadter | |
| 8,247,776 B2 | 8/2012 | Peng | |
| 8,319,188 B2 | 11/2012 | Ramsden | |

(Continued)

*Primary Examiner* — David P Porta
*Assistant Examiner* — Fani Boosalis

(57) ABSTRACT

Disclosed is a directional gamma ray or neutron detector system that locates a radioactive source both horizontally and vertically. In some embodiments, the system comprises four "side" detectors arrayed around a detector axis, and an orthogonal "front" detector mounted frontward of the side detectors. Embodiments can calculate the azimuthal angle of the source based on the detection rates of the side detectors, while the polar angle of the source may be calculated from the front detector rate using a predetermined angular correlation function, thereby localizing the source from a single data set without iterative rotations. In applications such as hand-held survey meters, walk-through portals, vehicle cargo inspection stations, and mobile area scanners, embodiments enable rapid detection and precise localization of clandestine nuclear and radiological weapons.

20 Claims, 22 Drawing Sheets

(56) References Cited

U.S. PATENT DOCUMENTS

| | | |
|---|---|---|
| 8,866,100 B1 | 10/2014 | Marleau |
| 8,930,165 B2 | 1/2015 | Vilim |
| 9,158,012 B2 | 10/2015 | Willis |
| 9,529,096 B2 | 12/2016 | Yamashita |
| 9,575,189 B2 | 2/2017 | Groves |
| 9,835,735 B2 | 12/2017 | Preston |
| 10,054,697 B1 | 8/2018 | Vancelj |
| 10,191,161 B1 | 1/2019 | Vencelj |
| 2003/0165211 A1 | 7/2003 | Grodzins |
| 2005/0121618 A1 | 6/2005 | Fowler |
| 2007/0221854 A1 | 9/2007 | Shirakawa |
| 2008/0048123 A1 | 2/2008 | Larsson |
| 2009/0271143 A1 | 10/2009 | Shirakawa |
| 2009/0309032 A1 | 12/2009 | Ramsden |
| 2015/0301203 A1* | 10/2015 | Lennert ............... H01J 47/1266 250/385.1 |
| 2016/0306052 A1 | 10/2016 | Ramsden |
| 2018/0172853 A1 | 6/2018 | Newman |

* cited by examiner

COMPACT DIRECTIONAL RADIATION DETECTOR SYSTEM

CROSS REFERENCES TO RELATED APPLICATIONS

This application claims the benefit of U.S. Provisional Patent Application No. 62/661,072 filed on Apr. 22, 2018, and U.S. Provisional Patent Application No. 62/726,295 filed on Sep. 2, 2018, and U.S. Provisional Patent Application No. 62/756,060 filed on Nov. 5, 2018, and U.S. Provisional Patent Application No. 62/830,356 filed on Apr. 5, 2019, the entire disclosures of which are incorporated herein by reference.

FIELD OF THE INVENTION

The present invention relates generally to radiation detection. More particularly, the present invention is directed in one exemplary aspect to a particle detector system that determines a two-dimensional location of a radiation source.

BACKGROUND

Clandestine nuclear weapons are an immediate threat to every country and every city in the world. A rogue nation with a nuclear weapon, or a terrorist group that acquires radiological material, could deliver it to a victim city via commercial shipping at low cost and low risk. Nuclear weapons are difficult to detect when shielded. Advanced radiation detectors are necessary to reveal such weapons among backgrounds and benign clutter. An urgent priority of the United States, and indeed of all countries, is the development of radiation detectors that both detect and localize clandestine nuclear material.

A signature of all nuclear and radiological weapons is radiation, principally gamma rays ("gammas") and neutrons. Gamma rays are detected when they interact with matter via photoelectric absorption in which the gamma ray is absorbed and a photoelectron is emitted, Compton scattering which generates a Compton electron and a scattered gamma ray, or electron-positron pair production. In each case, the energetic electron (or positron, treated as an electron herein) can be detected in a charged-particle detector such as a scintillator, semiconductor, or gaseous ionization detector. Neutrons are usually classified according to energy as fast, intermediate, and slow. A fast or high-energy neutron, as used herein, has 100 keV to several MeV of energy. Fast neutrons can be detected by neutron-proton elastic scattering in which the recoil proton passes through a detector such as a scintillator. Slow or low-energy neutrons (1 eV or less, also called thermal or epithermal) can be detected by a capture reaction in a neutron-capture nuclide, usually $^{10}B$ or $^{6}Li$, causing emission of prompt ions such as alpha and triton particles which can be detected in a scintillator or other ionization detector. Intermediate-energy neutrons can be moderated or decelerated by multiple elastic scattering in a hydrogenous material such as HDPE (high-density polyethylene) or PMMA (polymethylmethacrylate), and then detected as slow neutrons.

A directional detector that determines the location of a radiation source would be extremely helpful in detecting and localizing clandestine threats. Even a few gamma rays or neutrons coming from the same location could trigger an alarm. What is needed, then, is a gamma ray or neutron detector system that indicates the direction of the source, preferably with enough sensitivity to detect a shielded source from a single data set acquired at a single orientation. Preferably such a detector system would be compact, fast, efficient, easy to build, easy to use, and low in cost.

SUMMARY

Disclosed herein is a system for detecting and locating a radioactive source, comprising three or more side detectors positioned symmetrically around a detector axis that extends centrally from the back to the front of the system, each side detector configured to emit signals upon detecting particles from the radioactive source, and to block at least 50% of the particles orthogonally incident thereon; a slab-shaped front detector positioned frontward of the side detectors, orthogonal to the detector axis, and configured to emit signals upon detecting particles from the radioactive source, wherein the thickness of the front detector is at most 0.5 times the average interaction distance of the particles in the front detector, and the lateral dimensions of the front detector are at least 2 times the average interaction distance of the particles in the front detector; and a processor configured to receive the signals and to execute instructions stored in non-transient computer-readable media, wherein the instructions include calculating the azimuthal angle of the radioactive source by interpolating detection data of the side detectors, calculating a numerator according to the detection data of the side detectors, calculating a ratio equal to the numerator divided by detection data of the front detector, and comparing the ratio to a predetermined angular correlation function that provides an estimate of the polar angle of the radioactive source.

These and other embodiments are described in further detail with reference to the figures and accompanying detailed description as provided below.

DETAILED DESCRIPTION OF INVENTION

Figure 1A:
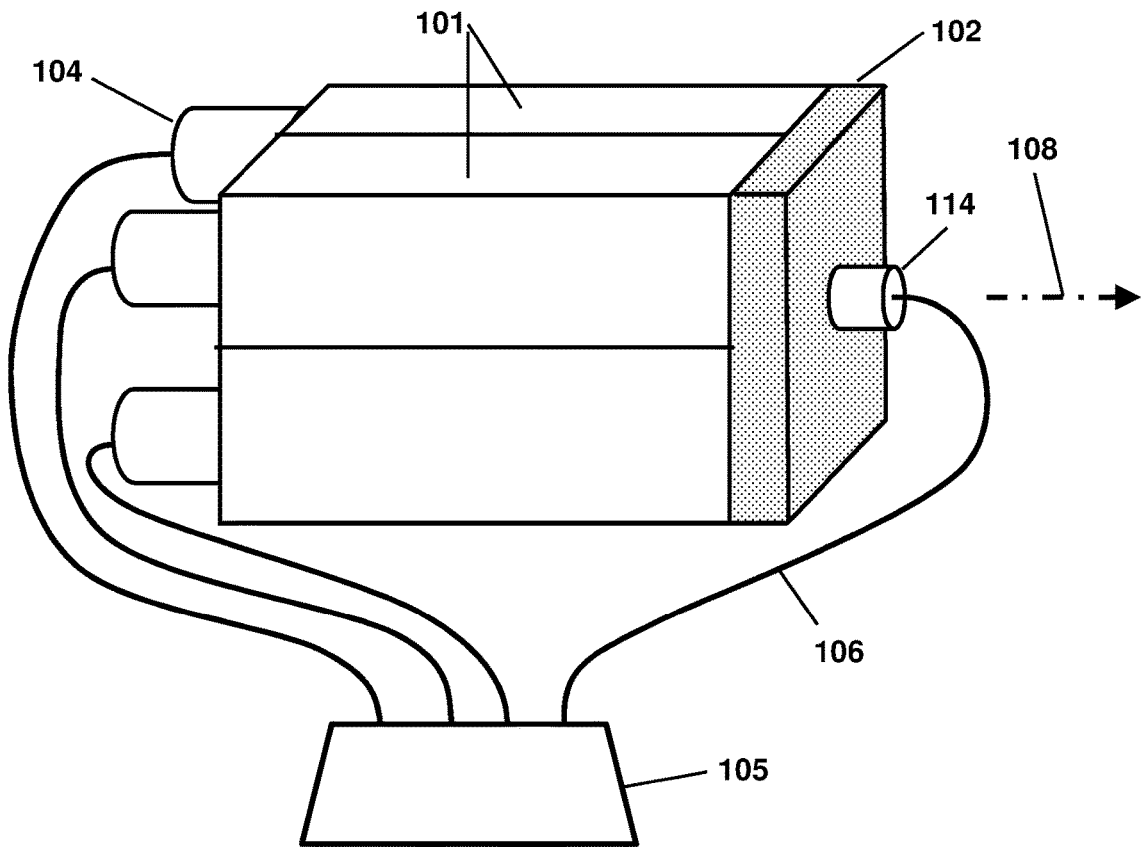
FIG. 1A is a perspective sketch of an exemplary system with four side detectors and a front detector, according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein are systems for detection, localization, and imaging of radiation sources (the "systems"). In some embodiments, the systems can be configured to detect particles from the radioactive source, determine the direction of the source in two dimensions, such as the azimuthal and polar angles of a spherical coordinate system, relative to a detector axis that runs from the back to the front of the system. Embodiments can also produce a two-dimensional image showing inspection objects with the source location indicated thereon. Examples are given for gamma ray and/or neutron detection, but the systems may be applicable to other particles as well. The system may comprise three or more "side" detectors symmetrically arranged around the detector axis, a "front" detector positioned in front of the side detectors and oriented perpendicular to the detector axis, all providing detection signals to a processor. The side and front detectors (collectively, the "detectors") may be configured to detect the source particles and responsively emit a signal for each particle detected, with each signal being uniquely associated with one of the detectors, respectively. The system may be "compact" in that the detectors may be arranged closely adjacent without intervening shielding or unnecessary air gaps.

In some embodiments, the processor can determine the azimuthal angle of the source according to particle detection data of the side detectors, and can determine the polar angle of the source according to detection data of the front detector. In some embodiments, the processor may calculate the polar angle by comparing a ratio to a predetermined angular correlation function, wherein the ratio may comprise a function of the side detector data divided by a function of the front detector data. The system can thereby determine the source location in two dimensions, using data acquired at a single position and a single orientation of the system. The particle detection data may comprise the number of events in which the signal exceeds a threshold value in a certain time interval, or a measured voltage or current or charge, or a particle detection rate, or other suitable measure of the detected particles. The particle detection rate is the number of times the signals from a detector exceed a threshold, per unit time. In some embodiments, the system can localize the source in the front half-space, which is the angular region spanning the polar angles from 0 to 90 degrees and azimuthal angles from 0 to 360 degrees. With the addition of a "back" detector positioned behind the side detectors, embodiments can detect and localize sources throughout the entire 4π space including azimuthal angles of 0-360 degrees and polar angles of 0-180 degrees, with high angular precision, from data acquired at a single orientation of the system, without rotations or iterations. The resulting source location can then be superposed as an icon or other indicator on a visible-light or infrared image according to the azimuthal and polar angles so determined, thereby indicating the source position among inspection items. The camera may be configured to adjust the camera viewpoint or aiming direction according to the azimuthal and polar angles of the source, so that the source location is centered in the camera's view and the icon or indicator is centered in the image. The indicator may be an elliptical shape, wherein the axes of the ellipse are configured to indicate the uncertainties in the azimuthal and polar angle determinations, respectively. Such a composite image can then be displayed or transmitted or recorded.

Turning now to the figures, FIG. 1A is a perspective sketch of an exemplary embodiment of the system, comprising four side detectors 101, a front detector 102 (in light stipple), and a processor 105. Each side detector 101 may have a right square prism shape as shown, and may comprise detector material configured to produce a pulsed signal 106 when traversed or partially traversed by an energetic charged particle such as an electron or an ion. The front detector 102 may be a slab-shaped body, also configured to emit a pulsed signal 106 when traversed or partially traversed by an energetic charged particle. The front detector 102 may be oriented perpendicular to the detector axis 108, and positioned frontward of the side detectors 101, and centered on the detector axis 108. The front detector 102 may have a square shape as depicted here, or it may be round or rectangular or triangular or other suitable shape. Each side detector 101 may have a square cross section or other shape, and may be elongate parallel to the detector axis 108. Thus the side detectors 101 may be oriented perpendicular to the front detector 102. Sensors 104 are shown connected to each side detector 101, and a further sensor 114 is shown connected to the front detector 102. Each sensor 104 or 114 may comprise a transducer or other signal-processing electronics, such as a photomultiplier tube or photodiode or amplifier, configured to tailor the signals 106 so that they can be received by the processor 105.

In some embodiments, particles from a radioactive source may interact in one of the side detectors 101 or in the front detector 102. The interaction may produce secondary particles ("secondaries") comprising gamma-generated electrons or neutron-generated ions, for example. The secondary particles may then cause the detector 101-102 to emit a pulse such as an electrical or light pulse, which may be detected by a sensor 104 or 114, which may then convey signals 106 to the processor 105. The processor 105 may comprise digital and/or analog electronics, and may include non-transient computer-readable media containing instructions for a method to calculate the azimuthal and polar angles of the source from detection data of the side and front detectors 101-102. The detection data may comprise the counting rates for each detector 101-102. such as the number of particle events detected in a time period, or other measure of particle interactions.

In some embodiments, the processor 105 may be configured to calculate the azimuthal angle of the source according to the side detector data. In a first embodiment, the processor 105 may be configured to determine the azimuthal angle of the source by interpolating between the angular positions of the two particular side detectors 101 that have the highest counting rates. In a second embodiment, the processor 105 may be configured to calculate a differential associated with each side detector 101, wherein each differential is equal to the counting rate of one of the side detectors 101 minus the counting rate of the diametrically opposite side detector 101, respectively. When the number of side detectors 101 is an odd number, then the differential may equal the counting rate of a respective one of the side detectors 101 minus the average of the two opposing side detectors 101. The processor 105 may be configured to calculate the azimuthal angle of the source by interpolating between the two highest differentials. In a third embodiment, the processor 105 may be configured to determine the azimuthal angle by performing a fit to the detection data or the differentials of the side detectors 101. Artisans may devise other methods for calculating the source azimuthal angle from the side detector data.

In some embodiments, the processor 105 may be configured to calculate the polar angle of the source by calculating a ratio R, comprising a numerator based on the side detector 101 detection data, divided by a denominator base on the front detector 102 detection data. The processor 105 may then compare that ratio R to a predetermined angular correlation function that provides an estimate of the polar angle of the source as output. For example, the numerator may be the detection data or counting rate of the highest-counting side detector 101, while the denominator may be the detection rate of the front detector 102. In a second embodiment, the numerator may be the highest differential of the side detectors 101. Alternatively, the numerator may be the sum of the detection data for the side detectors 101.

In some embodiments, the predetermined angular correlation function may be a set of data that relates the polar angle of the source to the ratio R. The data may comprise a table of measured or calculated values, an algorithmic form such as a formula or a computer code, a graphical relationship, or other arrangement of data configured to enable the determination of the polar angle from the detection data. The angular correlation function may further include effects, such as adjustments or corrections to the polar angle, based on the azimuthal angle. The predetermined angular correlation function may be prepared by measuring the front and side detector rates while a test source is moved at different polar angles around a system. Alternatively, a simulation program such as MCNP or GEANT may be used to calculate the various detector rates and the ratio R for each of several simulated source angles. The resulting R values, from the measurements or the simulations, may then be fit to an analytic function or programmed in a computer code or otherwise made accessible for determining the source polar angle from the detection data.

In some embodiments, the detectors 101-102 may have different detection efficiencies at different azimuthal angles, and the processor 105 may be configured to cancel such angular anisotropies by analysis. For example, the processor 105 may calculate the numerator as the highest counting rate or differential of the side detectors 101, plus a geometrical factor G times the second-highest counting rate or differential of the side detectors 101, wherein G is configured to cancel the angular anisotropies. Angular anisotropies are variations in the angle-dependent detection efficiencies of the side and front detectors 101-102 at various azimuthal angles. The geometrical factor G may largely cancel those anisotropies, so that the same angular correlation function can be used irrespective of the azimuthal angle, a convenience. The processor 105 can then provide the ratio R as input to the predetermined angular correlation function, and thereby obtain an estimate of the polar angle of the source.

As an alternative, the processor 105 may be configured to cancel anisotropies by applying two separate angular correlation functions, rather than using the geometrical factor G. The two angular correlation functions may be prepared at two predetermined azimuthal angles, and may be used for interpolation to cancel the anisotropies. For example, the two angular correlation functions may correspond to a first plane that passes through the centroid of one of the side detectors 101, while the second angular correlation function may correspond to a plane that passes between two adjacent side detectors 101, respectively. In FIG. 1, for example, the two predetermined angles may be at azimuthal angles of zero degrees and 45 degrees respectively. By symmetry, then the azimuthal angles of 90, 180, and 270 degrees correspond to the zero-degree correlation function, while azimuthal angles of 135, 225, and 315 degrees correspond to the 45-degree function. The processor 105 may then calculate two "candidate values" of the polar angle and interpolate them to obtain a final, corrected polar angle value. For example, the processor 105 may first determine the azimuthal angle according to the side detector data as described, and them may calculate the ratio R as described. The processor 105 may then apply R to each of the two angular correlation functions in turn to obtain the two candidate values, and may interpolate between the two candidate values according to the azimuthal angle of the source, thereby obtaining a value of the polar angle with the anisotropies largely eliminated. By combining the two candidate values according to the source azimuthal angle in this way, the angle-dependent detection efficiencies of the side and front detectors 101-102 may be corrected to high order.

As a further alternative, the angular correlation function may include values or functional forms that take, as input, both the R value and the azimuthal angle, and may thereby apply the anisotropy corrections internally using precalibrated data from the measurements or the simulations. In this way, the angular correlation function may provide a value of the polar angle with the anisotropies largely cancelled.

In some embodiments, the detectors 101-102 may comprise detector material suitable for detecting the particles. In an embodiment for detecting gamma rays, for example, the side and front detectors 101-102 may include an organic or inorganic scintillator, or a semiconductor detector comprising a back-biased junction, or a gaseous ionization detector such as a proportional or Geiger counter, or other suitable medium for producing a signal 106 responsive to gamma-generated electrons. In an embodiment for detecting fast neutrons, the detectors 101-102 may comprise a hydrogenous scintillator, such as a liquid or plastic scintillator, configured to detect recoil protons from elastic neutron scattering, or a scintillator with an ionization-dependent fluor that emits different pulses or pulse shapes for gamma-generated electrons versus recoil protons. For detecting low-energy neutrons, the detectors 101-102 may comprise PMMA or other transparent matrix loaded with microbeads of scintillator and a neutron-capture nuclide such as boron or lithium, configured so that the capture ions excite the scintillator microbeads strongly, while gamma-generated electrons hardly interact with the microbeads due to the electrons' low ionization density. Alternatively, recoil protons or capture ions can be detected in a threshold scintillator such as ZnS, coupled to a wavelength-shifted transparent medium. Capture ions can also be detected in a semiconductor detector or a gaseous ionization detector coated with a capture nuclide. A hydrogenous moderator may be included to enhance the detection efficiency of neutrons. As a further alternative, a material that produces different signals for highly-ionizing particles (recoil protons or reaction ions for example) than for lightly-ionizing particles (such as photoelectrons, Compton electrons, or pair-produced electrons and positrons). PSD (pulse-shape discriminating) scintillators are an example.

In some embodiments, the side or front detectors 101-102 may comprise an energy-resolving detector material, such as NaI scintillator, that emits a signal 106 proportional to the amount of energy deposited therein. Preferably the material can provide sufficient energy resolution to identify the source composition, for example by having an energy uncertainty of at most 10%, where the energy uncertainty may comprise the full width at half maximum of a total energy peak, divided by the total energy. NaI(Tl) and many other scintillators, as well as many solid-state detectors and some gaseous ionization detectors, can provide such a measurement of the particle energy, or of the energy deposited by secondaries. In some embodiments, the processor 105 may be configured to calculate the total particle energy by adding together the signals 106 emitted by each of the respective side detectors 101, or the energies derived therefrom. In other embodiments, the processor 105 may be configured to calculate a total energy by adding together the signals 106 or energies of the side detectors 101 plus the front detector 102. Such a total energy sum may have higher detection efficiency, higher detection rate, and comparable or lower energy uncertainty than obtainable in each of the detectors separately. To minimize energy losses in non-scintillating material, the side detectors 101 may be separated by thin reflective separators with little or no other intervening material. Also, when the side detectors 101 are hygroscopic, such as NaI, all of the side detectors 101 may be enclosed in a single hermetic enclosure, thereby avoiding having any enclosure walls between the side detectors 101. In addition, the front detector 102 may be enclosed in the same enclosure, regardless of whether the front detector 102 is the same type of scintillator as the side detectors 101. For example, the enclosure may enclose the side detectors 101 comprising NaI, and may also enclose the front detector 102 comprising CsI which has a different pulse width. The processor 105 may then be configured to add the energies corresponding to the signals 106 from each of the detectors 101-102 to obtain a full-energy value for the incident particle, and may thereby identify the source composition isotopically. The front and side detectors 101-102 may be separated by an opaque reflective barrier and viewed by separate light sensors from opposite sides. Alternatively, the front and side detectors 101-102 may be viewed by common light sensors with the signals from each detector being separated according to shape or other parameter.

In some embodiments, the size or thickness of the side detectors 101 may be sufficient to prevent a fraction (the "blocking fraction") of incident particles or their secondaries from reaching the other side detectors 101. For example, the side detectors 101 may be thick enough to block 30% or 50% or 90% or more of the particles that are orthogonally incident from the side (that is, incident with a polar angle of 90 degrees). Typically the detection of a particle occurs when the particle or its secondaries deposit sufficient energy in the detector 101-102 to produce a signal 106 exceeding a predetermined threshold. The threshold may be 10% of the incident particle energy, or other value depending on design. Thicker side detectors 101 generally provide higher detection efficiency and higher blocking fractions, and thereby higher contrast between side detectors 101 for various azimuthal angles of the source. Thinner side detectors 101 generally have lower cost and weight. Therefore the design of the side detectors 101 may be selected according to the relative importance of the detection efficiency and lateral contrast of the side detectors 101, versus the cost and weight of the system.

In some embodiments, the front detector 102 may be thick enough to detect all or substantially all of the orthogonally incident particles. The side detectors 101 can then detect particles that pass beside the front detector 102, as well as particles that scatter in the front detector 102 and then continue through to the side detectors 101. In other embodiments, the front detector 102 may be thin enough to allow a fraction of the incident particles to pass through without interacting in the front detector 102, thereby allowing more detections in the side detectors 101. Preferably the front detector 102 is thick enough to detect a sufficient number of the incident particles to provide a definite polar angle determination, but not so thick that it significantly shadows the side detectors 101. In some embodiments, the thickness of the front detector 102 may be sufficient to detect 30% or 50% or 90% of the orthogonally incident particles, with the rest traveling through the front detector 102 undetected. For detecting gamma rays or fast neutrons, the incident particles that scatter in the front detector 102 have a high probability of continuing in about the same direction, so that they can then be detected in one of the side detectors 101, in which case both the front and side detectors 101-102 are triggered simultaneously. These are valid events.

Low-energy neutrons, on the other hand, generate reaction products comprising heavy ions such as alpha particles, tritons, and recoil nuclei which have extremely short ranges. Therefore, low-energy neutrons generally cannot trigger both the front detector 102 and a side detector 101 simultaneously. If the capture nuclide is $^{10}$B, then usually it produces a de-excitation gamma ray which may be detected in one of the side detectors 101, however the gamma is emitted isotropically and therefore may be detected by any one of the side detectors 101 regardless of the direction of the initial particle. For these reasons, events in which the front and side detectors 101-102 are triggered simultaneously by low-energy neutrons may be rejected.

In some embodiments, the front detector 102 may have an angular sensitivity distribution that is substantially opposite to the angular sensitivity distribution of the side detectors 101. For example, the detection rate in the front detector 102 may be higher when the source is in front, while the detection efficiency of the side detectors 101 may be lowest when the source is in front. This difference in angular detection efficiencies may be employed by the processor 105 to calculate the source polar angle from the detection data. To accentuate this difference in detection efficiencies, the lateral dimensions of the front detector 102 may be at least two times, and more preferably three to five times, and possibly 10 or 20 times, the thickness of the front detector 102. The lateral dimensions of the front detector 101 are its dimensions perpendicular to the detector axis 108, while the thickness of the front detector 102 is the dimension parallel to the detector axis 108. The front detector 102, with a thickness that is substantially less than its lateral dimensions, may be mainly sensitive to particles arriving from the front, due to the larger area of the front surface than the side surfaces of the front detector 102. On the other hand, the side detectors 101 may be mainly sensitive to particles arriving from one side, due to the blocking effect of the front detector 102. In addition, the side detectors 101 may have an elongate shape that further enhances the side detection efficiency geometrically. The angular correlation function relates the polar angle to the difference in the angular sensitivities of the side and front detectors 101-102. The angular correlation function may thereby relate each value of the ratio R to the corresponding polar angle.

In some embodiments, the thickness of the front detector 102 may be substantially less than an average interaction distance of the particles in the material of the front detector 102, which thereby allows many particles to pass directly through the front detector 102. Those particles may then be detected in the side detectors 101. Also, the lateral dimensions of the front detector 102 may be substantially greater than the average interaction distance, so that most particles arriving from the side are likely to interact before traveling all the way through the front detector 102. Due to the small thickness of the front detector 102, the detection rate of the front detector 102 may be higher for particles arriving from the front than from the side. The "average interaction distance" is the distance that the particle can travel in a particular material, on average, before interacting in a way that would cause the particle to be detected. For gamma rays, the average interaction distance is the mean free path for Compton scattering or photoelectric absorption or pair-production, or alternatively is the inverse of the mass attenuation factor which includes all those interactions. For fast neutrons, the average interaction distance is the mean free path for neutron-proton scattering. For slow neutrons, the average interaction distance is the (projected) mean free path for neutron capture. In some embodiments, the front detector may be configured so that each lateral dimension of the front detector is at least two times the average interaction distance, while the thickness is at most 0.5 times the average interaction distance.

In some embodiments, the lateral dimensions of the front detector 102 may be substantially equal to the lateral dimensions of the array of side detectors 101, as depicted in the figure. In other embodiments, the front detector 102 may extend laterally beyond the array of side detectors 101, thereby providing additional detection area of the front detector 102. In other embodiments, the lateral dimensions of the front detector 102 may be smaller than the lateral dimensions of the array of side detectors 101 (or equivalently, the side detectors 101 may extend laterally beyond the front detector 102) thereby exposing part of the front surface of each side detector 101 to the particles without being unobscured by the front detector 102. In systems that include a back detector (discussed below), the back detector may have the same shape and size as the front detector 102, and thus may be laterally coterminous with the side detectors 101, or may extend laterally beyond the side detectors 101, or the side detectors 101 may extend laterally beyond the back detector, according to various embodiments.

Figure 1B:
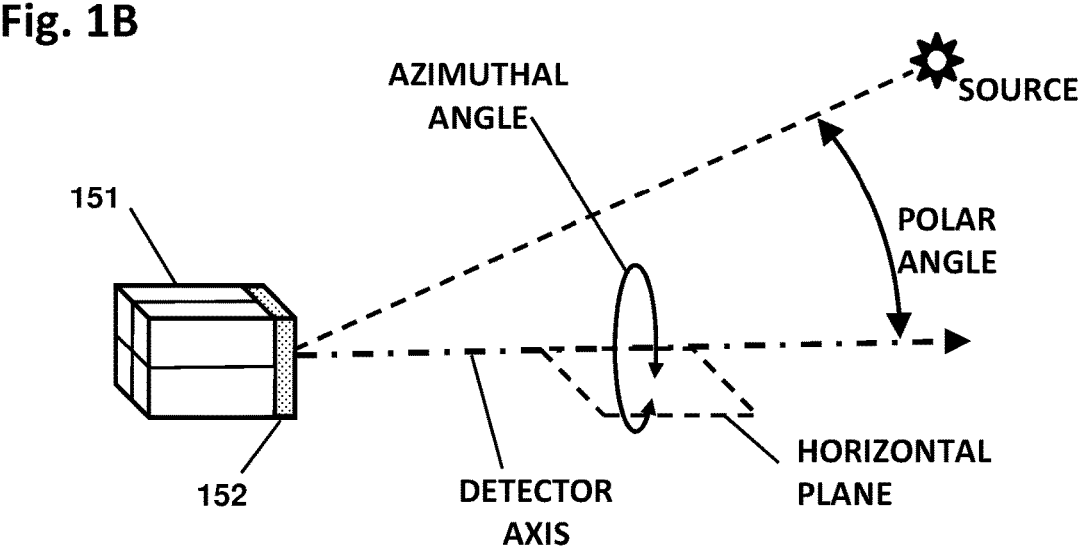
FIG. 1B is a perspective sketch showing how the azimuthal and polar angles are related to the detector axis and the source location, according to some embodiments.

FIG. 1B is a perspective sketch showing the spherical angles measured by an exemplary directional detector comprising side detectors 151 and a front detector 152. The detector axis, shown as a dot-dash line, is the central symmetry axis of the system. The source is indicated by a star, and the angles by arrowed arcs. The azimuthal angle is a rotational angle measured around the detector axis, with zero degrees at the right-side horizontal plane (shown in dash) as viewed from behind the system. The polar angle is the overall angle between the detector axis and the source. The polar and azimuthal angles thus localize the source direction in two dimensions.

Figure 2A:
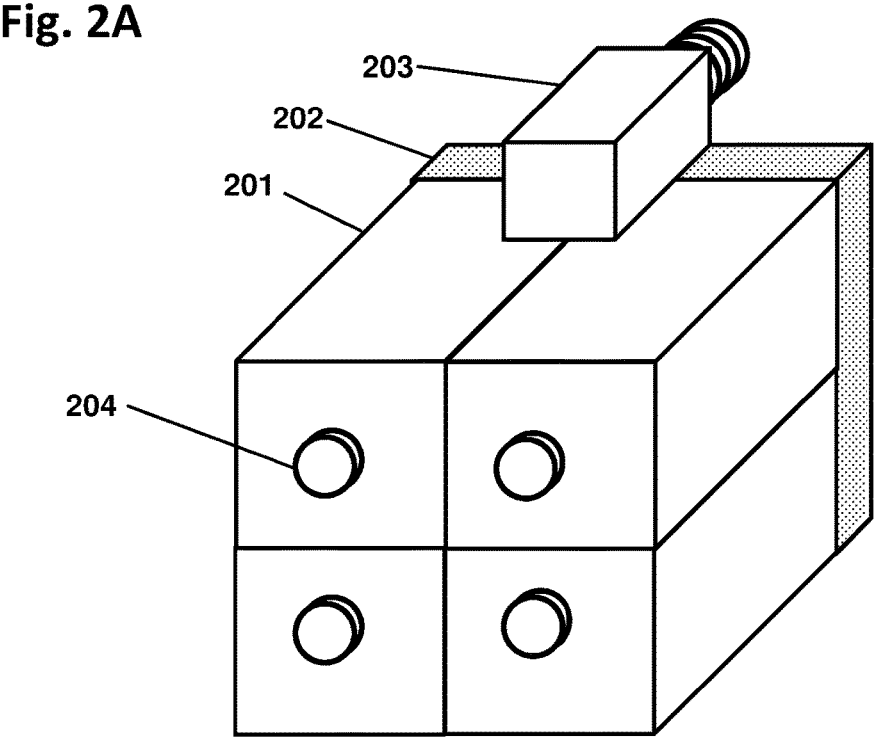
FIG. 2A is a rear-view perspective sketch of an exemplary system with a camera, according to some embodiments.

FIG. 2A is a rear-view perspective sketch of an exemplary system comprising four side detectors 201, a front detector 202 frontward of the side detectors 201, and sensors 204 such as photodiodes viewing the side detectors 201. Further light sensors (not visible) may be mounted on the front detector 202. A camera 203 is mounted above the detectors 201-202 and configured to produce images of an inspection scene frontward of the system. In other embodiments, the camera 203 may be configured to record wide-angle images such as images that cover most or substantially all of the front half-space, including polar angles of 0-90 degrees. The system may be configured to determine a direction of a source or, using images from the camera 203, a composite image that shows the inspection scene and the source location together.

Alternatively, instead of using separate light sensors 204, the side detectors 201 can be viewed by a single planar photocathode, followed by a multichannel plate charge amplifier, all mounted across the back of the system. The charge amplifier can be configured with four separate anodes, thereby providing four separate electrical pulse signals corresponding to each of the side detectors 201 separately. Likewise, the front detector 202 can be viewed by a similar planar photocathode-multichannel amplifier, but with a single anode spanning the front detector. Such planar light sensors can be made thin enough to avoid blocking a significant fraction of the incoming particles, according to some embodiments.

Figure 2B:
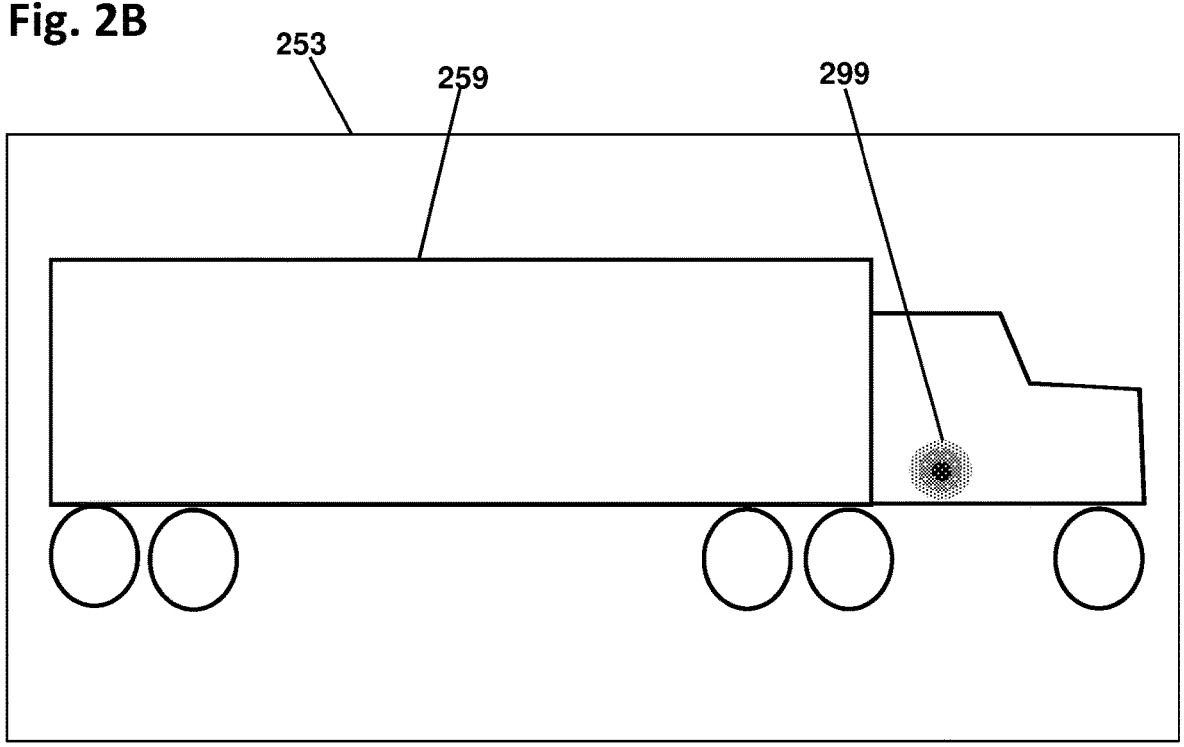
FIG. 2B is an exemplary image showing an inspection item and a source location indicator, according to some embodiments.

FIG. 2B shows an exemplary image 253 derived with the system of FIG. 2A for example. An inspection item comprising a truck 259 is being inspected. The trailer is clean, but a radioactive source has been hidden in the driver's sleeping compartment, as indicated by a detected radiation source distribution 299, which is superposed on the visible-light image. With this composite image 253, inspectors would know where to search to find the contraband 299.

Figure 3:
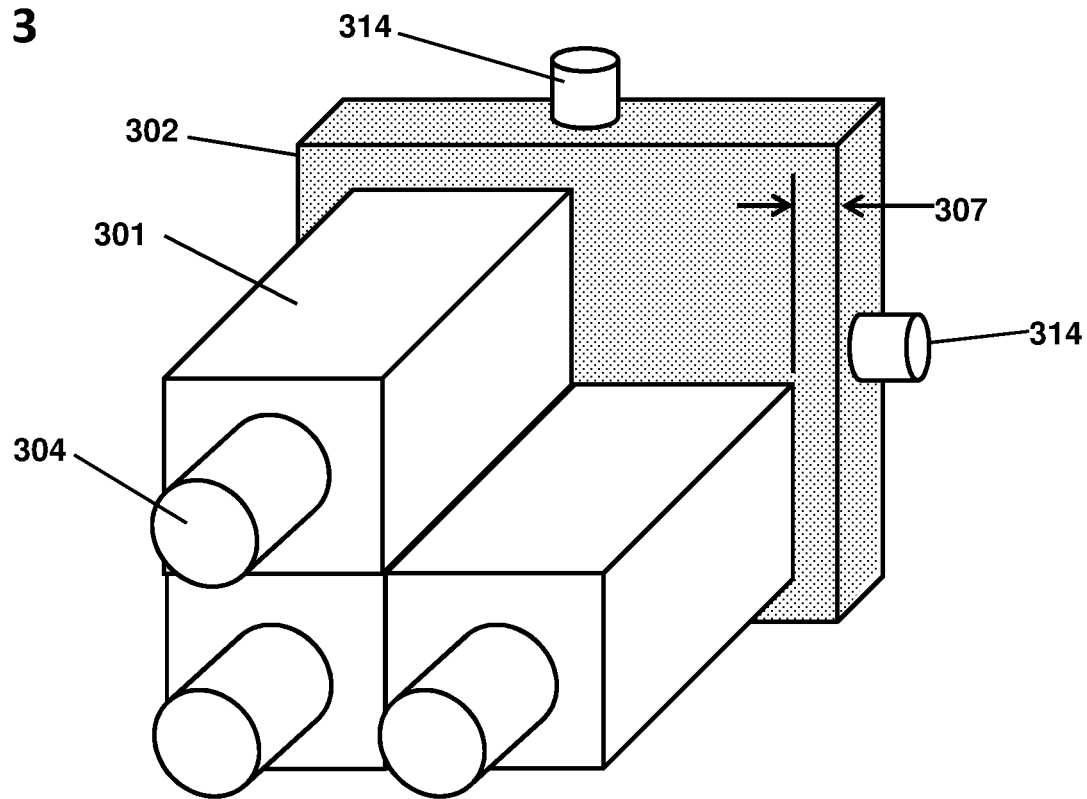
FIG. 3 is a rear-view perspective sketch of an exemplary system with a large front detector, according to some embodiments.

FIG. 3 is a rear-view perspective sketch of an exemplary system with four side detectors 301 (only three are shown) and a front detector 302 that extends laterally beyond the side detectors 301 by a distance 307. Thus the lateral dimensions of the front detector 302 are larger than the lateral dimensions of the array of side detectors 301, in contrast to the system of FIG. 1A in which the lateral dimensions of the front detector 102 are substantially the same as the lateral dimensions of the array of side detectors 101. The additional area of the front detector 302 can provide additional detection efficiency, and can also tailor the angular correlation function in various ways. Also shown are light sensors 304 such as photomultiplier tubes on the side detectors 301, and small light sensors 314 such as photodiodes positioned on the edges of the front detector 302 to avoid blocking incoming particles.

Figure 4:
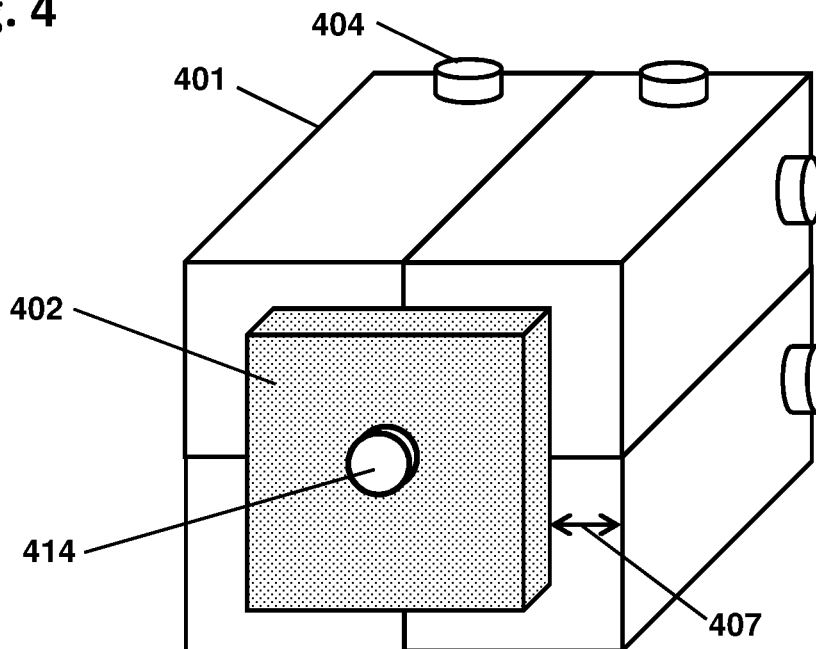
FIG. 4 is a front-view perspective sketch of an exemplary system with a small front detector, according to some embodiments.

FIG. 4 is a front-view perspective sketch of an exemplary system comprising four side detectors 401, a front detector 402, compact sensors 404 on the lateral surfaces of the side detectors toward the back, and another compact sensor 414 centered on the front detector 402. The sensors 404 and 414 thus comprise two separate sets, a first set of sensors 404 on the side detectors 401 and a second, separate set of (one or more) sensors 414 on the front detector 402. The lateral dimensions of the front detector 402 are smaller than the lateral dimensions of the side detector 401 array as shown, thereby leaving an open space 407 in which the side detectors 401 are directly exposed to incoming particles from the front, unobscured by the front detector 402.

In some embodiments, the sensors 404 on the side detectors 401 may be positioned rearward, as shown, to minimize blocking of particles that arrive from the front half-space. Also, two sensors 404 are shown on each side detector 401 to ensure sufficient signal collection. The front sensor 414 is shown in the center of the front detector 402 so that any obscuration effects from the front sensor 414 are symmetrically distributed across the front detector 402 and the four side detectors 401. As an alternative, the front sensor 414 may be mounted on the back surface of the front detector 402, by spacing the front detector frontward away from the side detectors 401.

Figure 5:
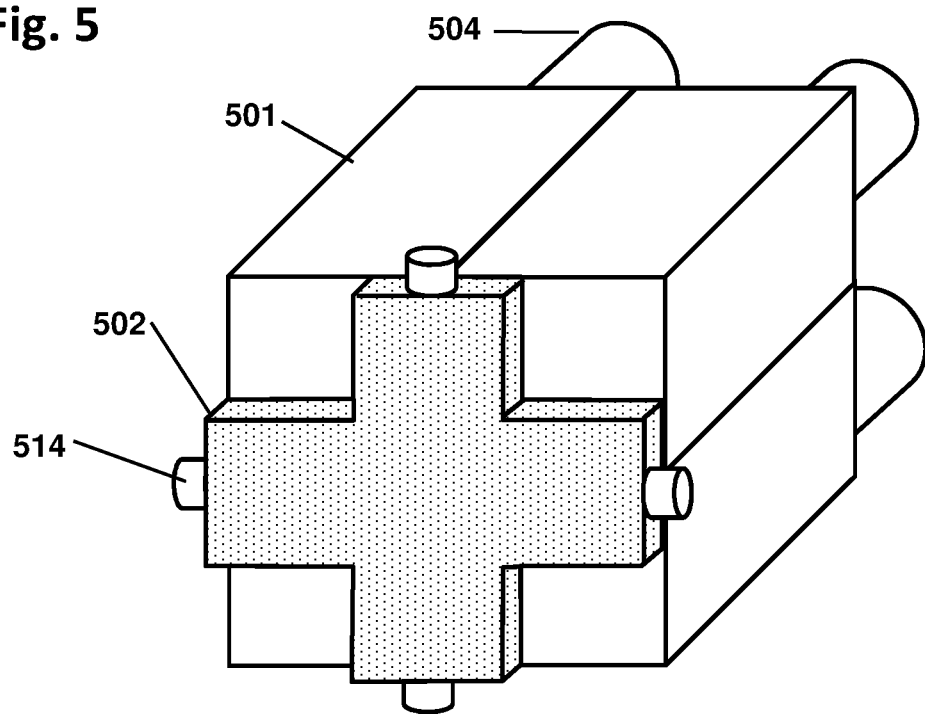
FIG. 5 is a perspective sketch of an exemplary system with a partially-occluding front detector, according to some embodiments.

FIG. 5 is a front-view perspective sketch of an exemplary system comprising four side detectors 501, a front detector 502, four sensors 504 attached to the side detectors 501, and four small sensors 514 attached to the front detector 502. The front detector 502 is shown configured as a cross shape, thereby leaving part of the frontal area of the side detectors 501 unobscured. Also, the front sensors 514 are shown mounted exteriorly on the ends of the arms of the front detector 502, to avoid shadowing the side detectors 501 when the system is aligned with the radioactive source. As an alternative, the front detector 502 could be shaped differently, such as an octagon or diamond shape for example, to allow a portion of each side detector 501 to view particles unobscured from the front. In some embodiments, including the depicted embodiment, the front detector 502 may be configured to obscure the same fraction of each of the side detectors 501 respectively, thereby simplifying analysis.

Figure 6:
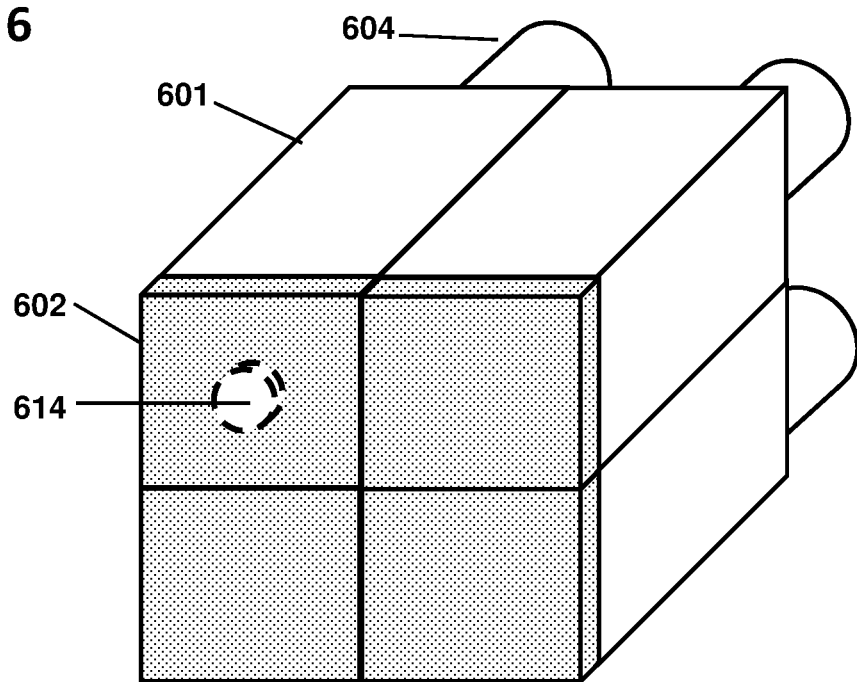
FIG. 6 is a perspective sketch of an exemplary system with separate front detector portions, according to some embodiments.

FIG. 6 is a front-view perspective sketch of an exemplary system comprising four side detectors 601, four sensors 604 attached to the side detectors 601, and a front detector comprising four front detector portions 602. In some embodiments, if N is the number of side detectors 601, then there are also N front detector portions 602, N being any integer of 3 or greater. Thus the system may include one front detector portion 602 for each side detector 601, and likewise one side detector 601 for each front detector portion 602. In some embodiments, a first set of sensors 604 may be coupled to the side detectors 601 respectively, and a second separate set of sensors 614 (one shown, in dash) may be coupled to the front detector portions 602 respectively, in which case the side and front detectors 601-602 each produce separate signals.

In other embodiments, the front and side detectors 601-602 may be viewed by a shared sensor 604. In that case, the second set of sensors 614 may be eliminated, saving costs. For example, the front detector portions 602 may be coupled to the respective adjacent side detectors 601, with both being read out by a respective one of the sensors 604. The signals from the front detector portions 602 may be detectably different from the signals of the side detectors 601 so that they can be separated in analysis. More specifically, each front detector portion 602 may be coupled to exactly one of the side detectors 601 respectively, and each side detector 601 may be coupled to exactly one of the front detector portions 602 respectively, and each set of coupled detectors may be read out by its attached sensor 604. The processor may be configured to determine which of the detectors, side 601 or front 602, has detected each particle according to a parameter of the signals that distinguishes the two coupled detectors. For example, the side detectors 601 may be made of a different material than the front detector portions 602, so that each side detector 601 may emit detectably different signals or pulses from those of the front detector portions 602. In some embodiments, the front detector portions 602 may comprise scintillators such as $CaF_2$ with a 900 ns pulse width, and the side detectors 601 may be NaI with a 230 ns pulse width, while a shared photomultiplier tube sensor 604 may view each side detector 601 and its coupled front detector portion 602 together. Each sensor 604 may then receive light pulses or other signals from the side detector 601 to which the sensor 604 is coupled, as well as signals from the front detector portion 602 that is coupled to that side detector 601. The signals from the side detectors 601 can then be separated from signals of the front detector portions 602 by suitable signal processing means, such as pulse shape discrimination which is well known in the field. One advantage of this configuration may be economy, since only one sensor 604 is needed per quadrant. Other advantages may be reduced weight and reduced power consumption by avoiding separate sensors on the front detector portions 602. In addition, the blocking of particles by a frontward sensor is avoided, and the entire system may be made more compact. The depicted system may be fabricated conveniently in separate quadrants, with each quadrant comprising one front detector portion 602, one side detector 601, and one sensor 604, all bound together as a unit. Each quadrant can be tested separately before being assembled into the final system, thereby allowing the quadrants to be matched in efficiency. Separate quadrant assembly may also simplify repairs when needed.

The various signals from the four front detector portions 602 may be added together and the combined detection data may be used in the polar angle calculation. For example, the detection data of the four front detector portions 602 may be combined using electronics or software for example, and may thereby form an effectively undivided front detector that spans across the entire assembly. Combining the detection data from the four front detector portions 602 may simplify analysis since the combined data can be used as if the system had a single spanning front detector. Combining the data in this way may also cancel a variety of effects such as the blocking of one of the front detector portions 602 by another front detector portion 602, particularly at high polar angles. The combined front detector detection rate may then be used as the denominator in the ratio R for determining the polar angle. Although the angular response of each individual front detector portion 602 may be asymmetric due to its off-center placement, the combined data from all four front detector portions 602 is overall symmetric, just as if there were a single undivided monolithic front detector.

Figure 7:
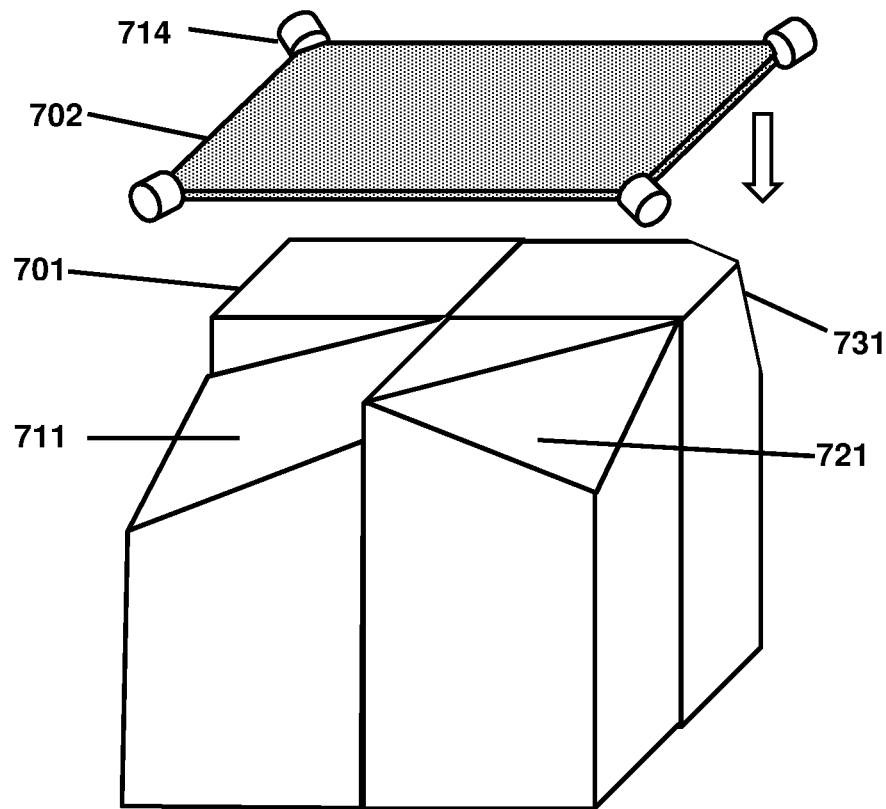
FIG. 7 is a perspective sketch, partially exploded, of an exemplary system with beveled side detectors, according to some embodiments.

FIG. 7 is a perspective sketch, partially exploded, of an exemplary system comprising four side detectors, each shown with a different shape to illustrate examples. The side detectors are beveled in various ways to sharpen the angular resolution, by avoiding detecting particles that arrive from certain angles. For example, a particle may arrive at an oblique polar angle such as 45 degrees, pass over the nearest side detectors, and then strike the farther or downstream side detectors. Each such "wrong" or downstream side detector event reduces the contrast and the angular resolution achievable with limited data. To avoid such events, the side detectors may be beveled or trimmed in various ways.

In the figure, four exemplary side detector shapes labeled 701, 711, 721, and 731 are shown, plus a front detector 702 with sensors 714 attached to the corners. A first side detector 701 has a regular right square prism shape, similar to those shown in the previous drawings. A second side detector 711 has a bevel or slope covering its entire front surface. Particles that arrive from the front at large angles may pass by the beveled front surface without being detected, which thereby avoids counting those errant particles in the downstream detector. A third side detector 721 is shown with an alternative bevel, that extends across half the front area of the side detector. A fourth side detector 731 has a steeper bevel cut, which removes a smaller fraction of the front surface area. In each case, the bevel is on the outside corner of the respective detector. Each of the bevel shapes shown has a different effect on the side detector angular efficiency. Four different shapes are shown together in the sketch to illustrate alternative options; in a practical system, all four of the side detectors are preferably made with the same shape to simplify analysis.

Figure 8:
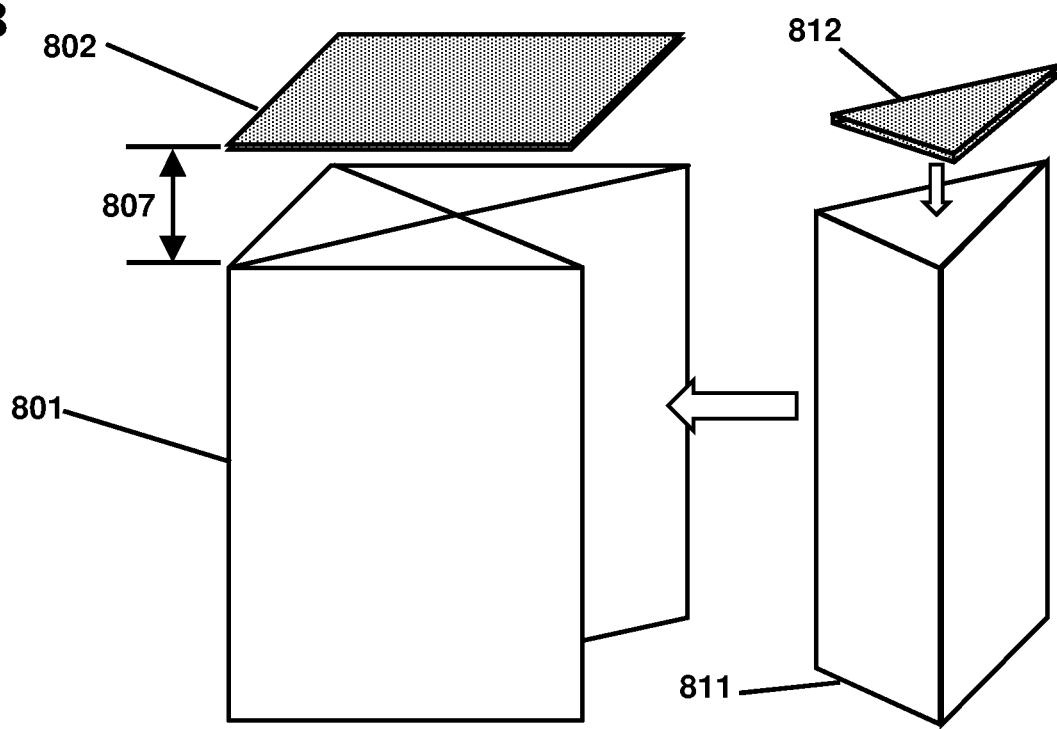
FIG. 8 is a perspective sketch, partially exploded, of an exemplary system with triangular shaped side detectors, according to some embodiments.

FIG. 8 is a partially exploded perspective sketch of an exemplary system with four triangular-prism-shaped side detectors 801 and a monolithic front detector 802 that is mounted spaced apart from the front edge of the side detectors 801 by the distance 807. The spaced-apart distance 807 may provide room for sensors or electronics. The spaced-apart distance 807 may also be adjusted to tailor the shape of the angular correlation function, by allowing particles from some angles to pass under the front detector 802, and thereby strike the side detectors 801 without the partial blocking caused by the front detector 802. Also shown is an alternative embodiment, in which four separate front detector portions 812 (one shown) may be prepared with one portion 812 attached to each side detector 811 respectively. Each such assembly may advantageously be bench-tested in separate quadrants, and then mounted together to form the complete system as shown.

Figure 9:
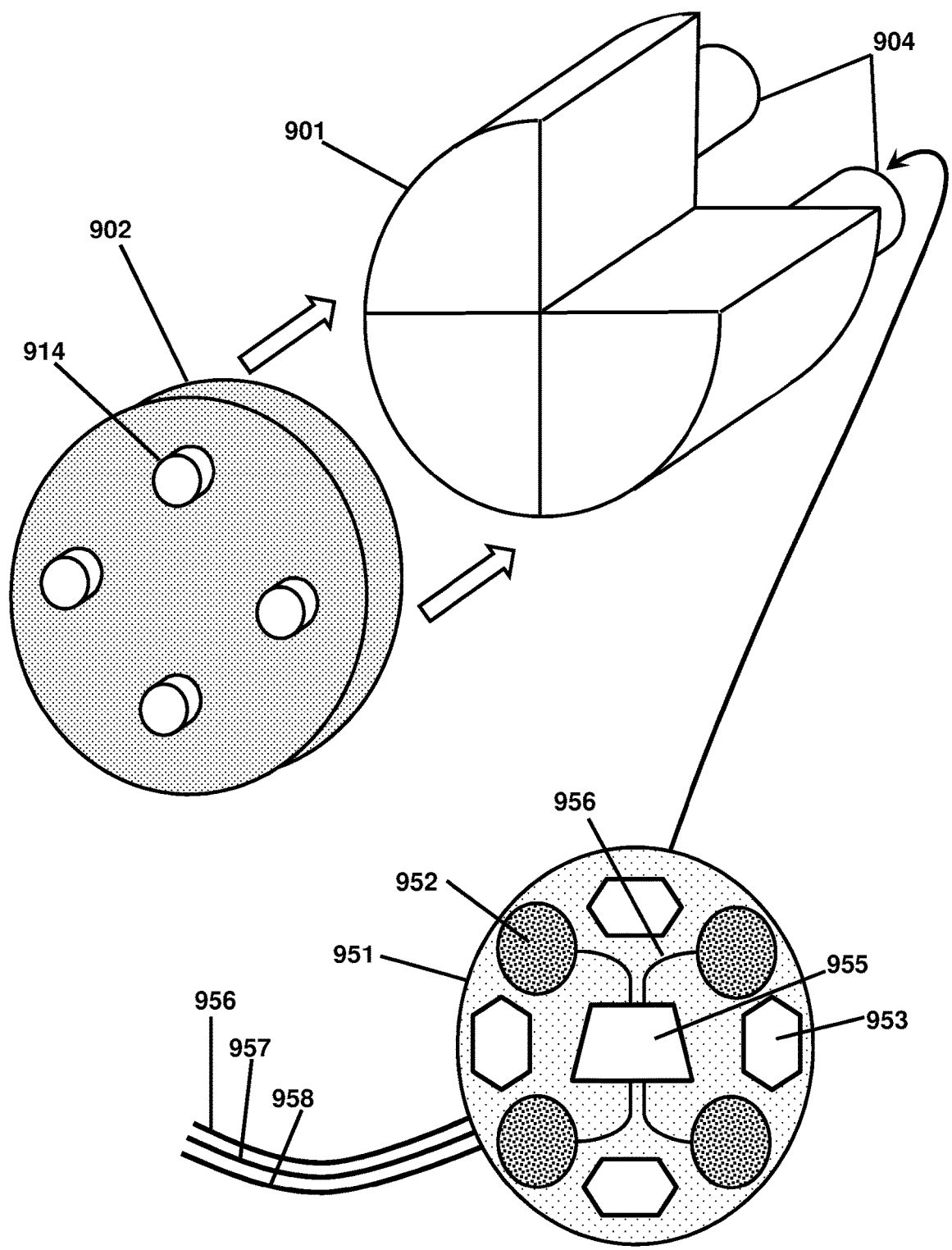
FIG. 9 is a perspective sketch, partially exploded, of an exemplary system with a cylindrical shape, according to some embodiments.

FIG. 9 is an exploded front-view perspective sketch of an exemplary system configured as a cylindrical assembly including four side detectors 901 (only three shown), each side detector 901 being shaped as a 90-degree pie-section prism and viewed by a sensor 904. Also shown is a disk-shaped front detector 902 which includes four solid-state sensors 914. The configuration may be advantageous when spatial constraints require a cylindrical shape, such as a tubular shell constraint. Also shown is a highly notional sketch of an exemplary circuit board 951 which may be mounted onto the sensors 904. In some embodiments, the circuit board 951 may include power control circuits 952 such as resistor dividers for photomultiplier tubes or voltage regulators and isolators for amplifier type sensors, a processor 955, connected to the powering circuits 952 by signal-carrying traces 956, and other circuit elements 953 such as voltage converters, analog signal-processing circuits, and the like. When mounted to the sensors 904, the circuit board 951 may also provide some mechanical stabilization to the system. The processor 955 may be programmed remotely or locally using JTAG pins or the like, thereby allowing firmware updates without disassembling the system. The circuit board 951 may be powered and read out by a simple 3-wire connection comprising power 956, serial data 957, and ground 958 in some embodiments. In other embodiments, a 4-wire protocol such as USB may be implemented. Together, the front detector 902, the side detector 901 array, the sensors 904, and the circuit board 951 may comprise a compact and easily mounted light-weight directional detector system with many applications.

Figure 10A:
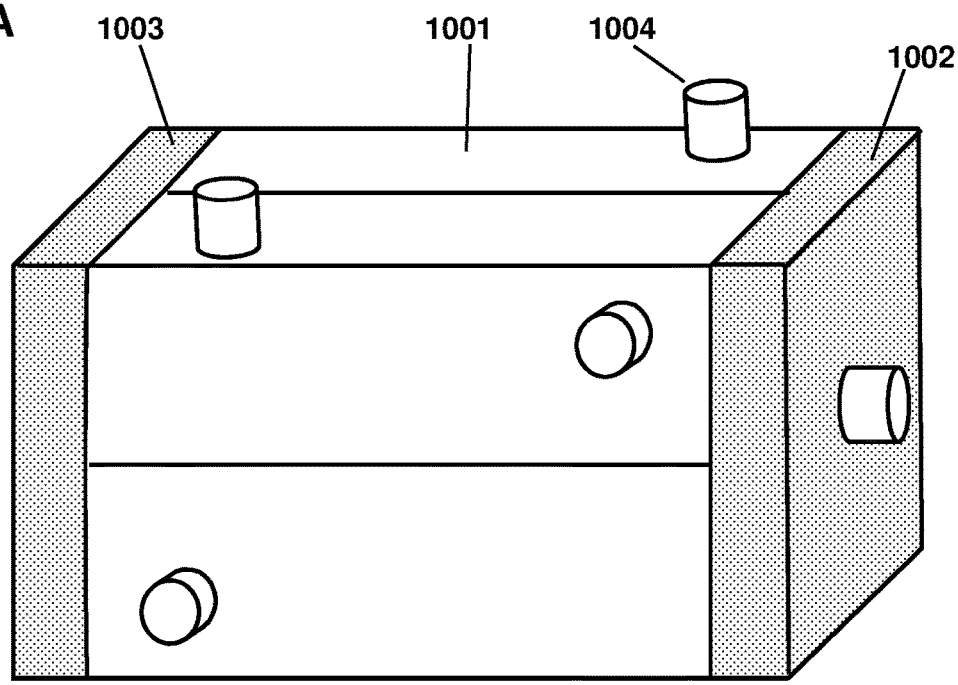
FIG. 10A is a perspective sketch of an exemplary system with front and back detectors, according to some embodiments.

FIG. 10A is a perspective sketch of an exemplary bi-directional or double-ended system, with side detectors 1001, a front detector 1002 and a back detector 1003. The back detector 1003 may be a slab-shaped detector configured to detect the particles from the source and emit signals, and may be oriented perpendicular to the detector axis and positioned behind, or to the back of, the side detectors 1001. The back detector 1003 may have the same shape and/or composition as the front detector 1002. The lateral dimensions of the back detector 1003 may be at least four times the thickness of the back detector 1003. The thickness of the back detector 1003 may be at most 0.5 times the particle interaction distance therein, and the lateral dimensions of the back detector 1003 may be at least 2 times the particle interaction distance. Sensors 1004 are also shown. The front and back detectors 1002 and 1003 can receive particles from the front and back half-space regions respectively, thereby covering a full 4π solid angle of view. The system can determine whether the source is in front or behind by comparing the detection rates of the front and back detectors 1002-1003. The system can then analyze the side detector 1001 detection data to determine the azimuthal angle of the source, and calculate a ratio R according to the side detector 1001 data divided by the detection data of whichever front or back detector 1002-1003 has the higher detection rate. Then that ratio can be compared (or provided as input) to a predetermined angular correlation function that directly indicates the polar angle of the source. In some embodiments, both the ratio R and the calculated azimuthal angle may be provided as inputs to the angular correlation function, which then determines the polar angle with anisotropies canceled. Alternatively, two angular correlation functions, corresponding to different azimuthal angles, can be used and interpolated to obtain a polar angle value that corrects for anisotropies of the detectors 1001-1003.

In some embodiments, the bi-directional or double-ended version of FIG. 10A may be useful in applications where a source could be located anywhere around the system, such as a mobile area scanner that searches for hidden weapon material throughout a wide area on both sides. The bi-directional system may also be useful in a vehicle inspection station in which multiple parallel lanes are active, since the bi-directional system can inspect two vehicles on opposite sides of the system at the same time.

Figure 10B:
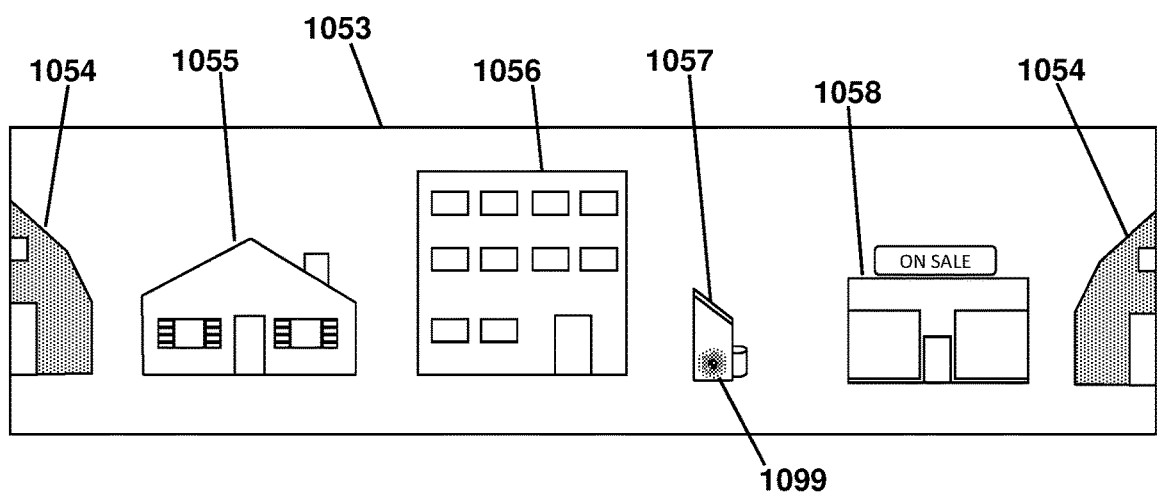
FIG. 10B is a sketch of an exemplary image including inspection objects and a source location indicator, according to some embodiments.

FIG. 10B is an exemplary image of a 360-degree scene surrounding a double-ended detector such as that of FIG. 10A. The image 1053 includes a barn 1054, a house 1055, an apartment building 1056, a small shed 1057, and a store 1058 which are being scanned by a vehicle-mounted double-ended directional detector such as that of FIG. 10A. The barn 1054 appears on both sides of the image 1053 since the image 1053 extends around 360 degrees.

The image 1053 further also shows a radiation indicator 1099, which in this case is a map or distribution of the detected radiation. Apparently an adversary has concealed some stolen nuclear material in the otherwise innocent-looking shed 1057. With this data, officials can retrieve the lost radioactive material, and perhaps the adversary as well.

Figure 11A:
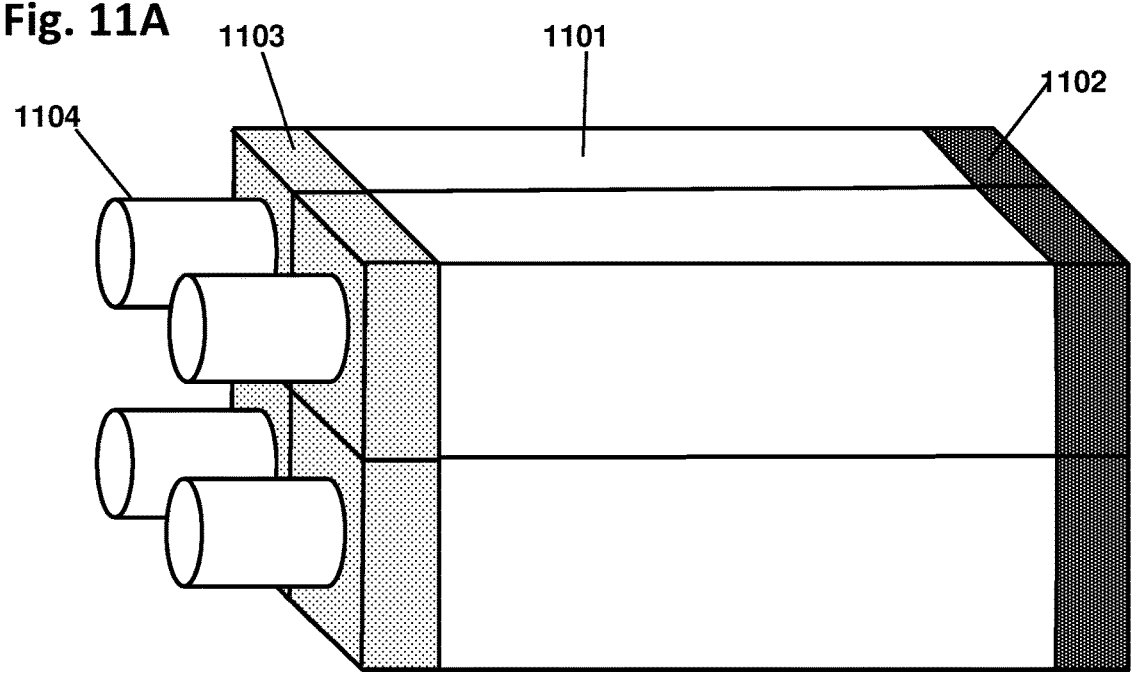
FIG. 11A is a perspective sketch of an exemplary system with front and back detectors divided into portions, according to some embodiments.

FIG. 11A is a perspective sketch of an exemplary bi-directional detector such as that of FIG. 10A, but now the front and back detectors are divided into portions labeled 1102 and 1103 respectively. Also, the front detector 1102 is made of a different material, with different signal properties, than the back detector 1103. Each front or back detector portion 1102 or 1103 may be optically coupled to the intervening side detector 1101, and that combination may be viewed by one of the sensors 1104, respectively. For example, each front detector portion 1102 may be optically coupled to exactly one of the side detectors 1101 respectively, and each back detector portion 1103 may be optically coupled to exactly one of the side detector portions 1101 respectively, and each such combination may be optically coupled to exactly one of the sensors 1104 respectively. Thus each sensor 1104 may collect pulses or signals from one of the front detector portions 1102, and one of the side detectors 1101, and one of the back detector portions 1103, respectively, all together. To differentiate the various pulses or signals, the front detector portions 1102 may comprise a first material, the side detectors 1101 may comprise a second material different from the first material, and the back detector portions 1103 may comprise a third material different from the first two materials, wherein each of the materials is configured to emit a detectably different signal or pulse. For example, the front, side, and back detectors 1101-1103 may comprise three different scintillators producing three differently shaped light pulses that can be separated in analysis. In an embodiment, the side detectors 1101 may be PVT scintillator with a 5 ns pulse width, the front detector portions 1102 may be BGO with a 300 ns pulse width, and the back detector portions 1103 may be $CaF_2$ with a 900 ns pulse width. An advantage of coupling the detectors in this way may be economy, since only N sensors 1104 may be needed, N being the number of side detectors 1101. It may be noted that some particles from the back are blocked by the sensors 1104; however, this asymmetry may be accounted for in the angular correlation function.

Figure 11B:
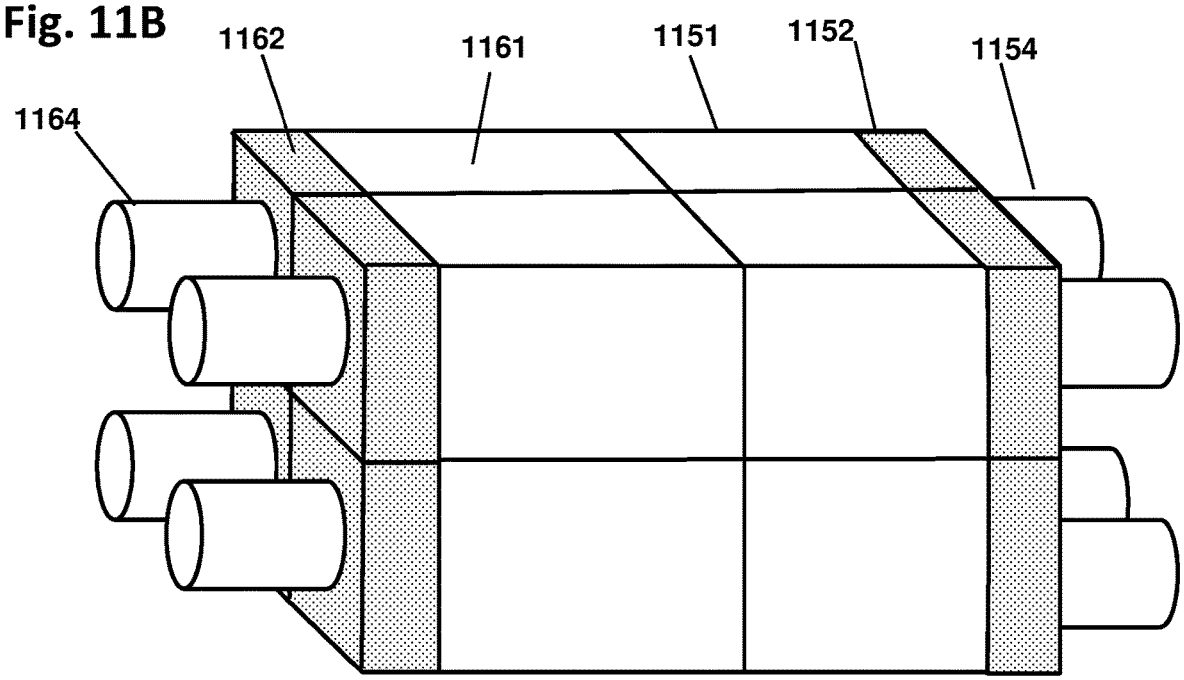
FIG. 11B is a perspective sketch of an exemplary system in which the side detectors are divided at the midplane, according to some embodiments.

FIG. 11B is a perspective sketch of an exemplary double-ended system which is split symmetrically at the midplane. The midplane is a centrally positioned plane perpendicular to the detector axis. A first set of side detectors 1151 are coupled to front detector portions 1152 which are coupled to sensors 1154 that view both the attached front detector portion 1152 and the coupled side detector 1151. A second set of side detectors 1161 is coupled to back detectors 1162 which are viewed by back sensors 1164. The depicted embodiment may detect radiation from a source located at an arbitrary position throughout the 4π solid angle, that is, 0-180 degrees in polar angle, 0-360 degrees in azimuthal angle, from a single position and a single orientation, according to some embodiments.

Figure 12:
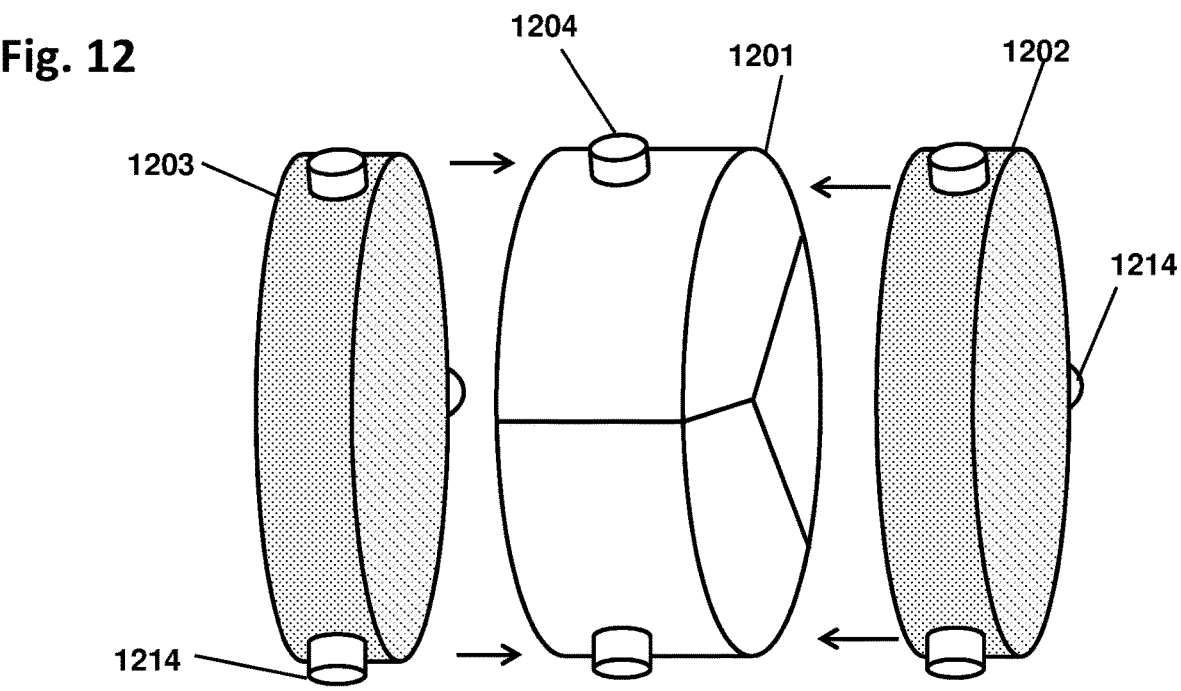
FIG. 12 is an exploded perspective sketch of an exemplary system with three side detectors and front and back detectors, according to some embodiments.

FIG. 12 is an exploded perspective sketch of an exemplary system with three-fold symmetry, having three pie-sector-shaped side detectors 1201. The depicted system also includes a disk-shaped front detector 1202 and a disk-shaped back detector 1203 covering the front and back of the system respectively, and sensors 1204 on the three side detectors 1201, with additional sensors 1214 on the front and back detectors 1202-1203. Each side detector 1201 is a prism with an extrusion direction in the longitudinal direction. The extrusion dimension of the side detectors 1201 is the shortest dimension of the side detectors 1201 in the depicted embodiment. Nevertheless, each side detector 1201 may be sensitive primarily to particles from the side, due to the blocking effect of the other side detectors 1201 and the front and back detectors 1202-1203. The front and back detectors 1202-1203, on the other hand, may be mainly sensitive to particles from the front or back respectively. These contrasting sensitivity distributions may allow the polar angle to be determined from detection data, specifically by comparing detection rates in the side detectors 1201 with whichever of the front or back detectors 1202 or 1203 has the higher counting rate. Sensors 1204 can be connected to the side detectors 1201, and other sensors 1214 can be connected to the front and back detectors 1202-1203.

Figure 13:
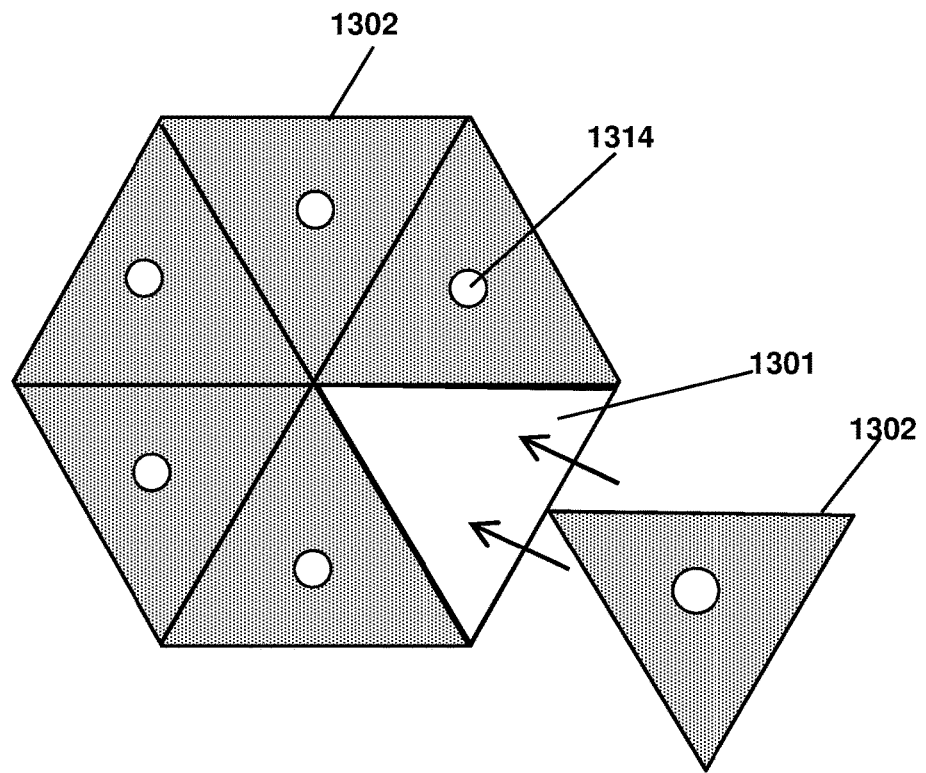
FIG. 13 is a cross-section sketch, partially exploded, of an exemplary system with hexagonal symmetry and six side detectors, according to some embodiments.

FIG. 13 is a transverse cross-section view of a hexagonal embodiment of the system with six triangular side detectors 1301 (only one visible) and six separate front detector portions 1302 matching the shape of each side detector 1301. A small sensor 1314 such as photodiode light sensor or an amplifier circuit may view each front detector portion 1302. As an alternative, instead of the separate front detectors 1302, a single hexagonal monolithic front detector may be used.

Figure 14:
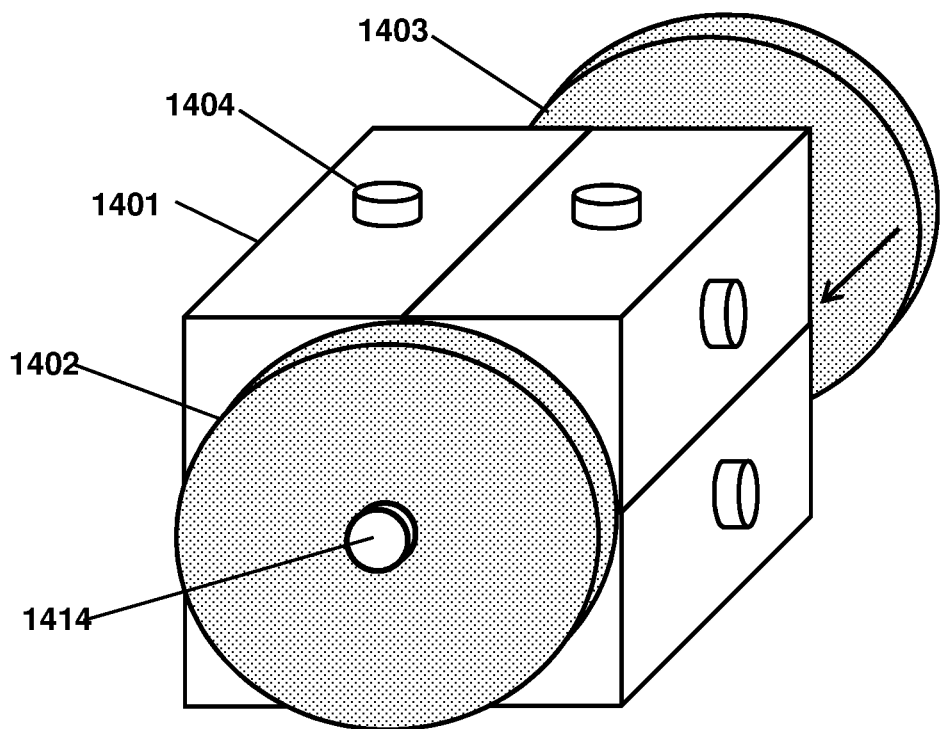
FIG. 14 is a perspective sketch, partially exploded, of an exemplary system with front and back disk-shaped detectors, according to some embodiments.

FIG. 14 is a partially exploded perspective view of an exemplary system comprising four side detectors 1401, a disk-shaped front detector 1402, and a disk-shaped back detector 1403. Sensors 1414 are centrally positioned on the front and back detectors 1402-1403 and further sensors 1404 are positioned around the midplane of the side detectors 1401. The midplane position of the sensors 1404 on the side detectors 1401 may improve the front-back symmetry and thereby simplify analysis.

The disk-shaped front and back detectors 1402-1403 may have a detection efficiency that is independent of the azimuthal angle due to their symmetry. This may further reduce nonlinearities and azimuthal anisotropy effects in the angular correlation function. Also, the disk-shaped front and back detectors 1402-1403 leave a portion of the front surface of each side detector 1401 unobscured, thereby enabling the side detectors 1401 to detect particles from a source aligned with the detector axis.

Figure 15:
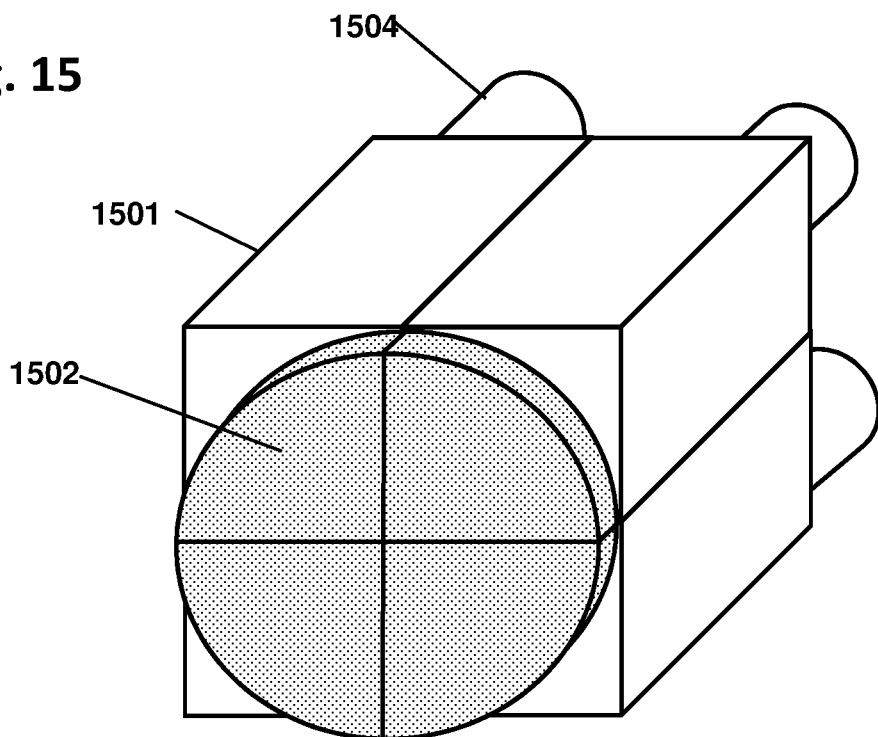
FIG. 15 is a perspective sketch of an exemplary system with a disk-shaped front detectors divided into portions, according to some embodiments.

FIG. 15 is a perspective sketch of an exemplary system comprising four side detectors 1501 viewed by four sensors 1504 from the back, and coupled to four front detector portions 1502 that together comprise a disk shape. Thus each sensor 1504 may be configured to receive signals (such as light pulses or electrical pulses) from one of the side detectors 1501 and the associated front detector portion 1502, respectively. The front detector portions 1502 may comprise a different material than the side detectors 1501 and may be configured to emit detectably different signals such as different pulse shapes, thereby enabling the various detector signals to be separated in analysis.

Figure 16:
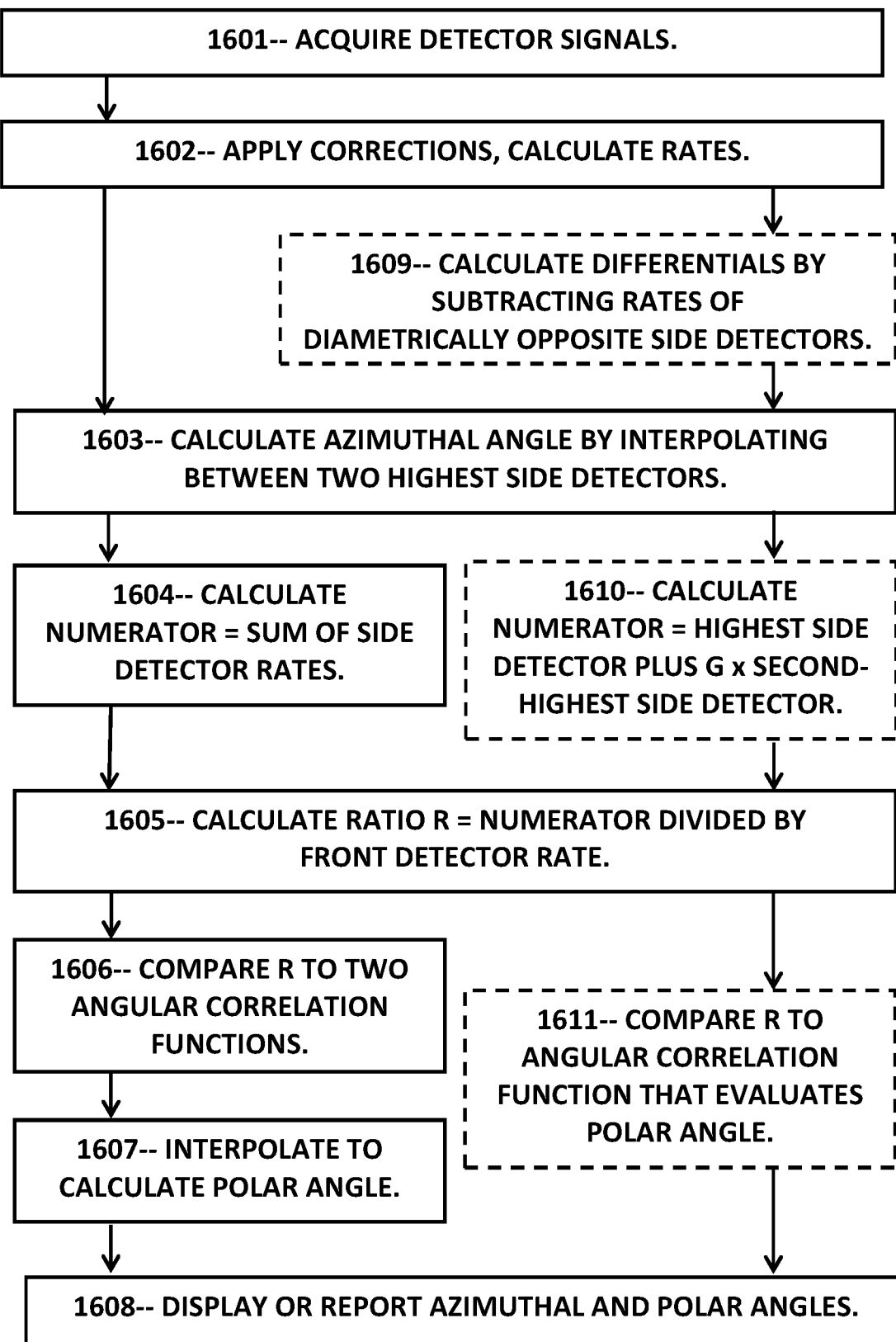
FIG. 16 is a flowchart showing steps of an exemplary method for calculating the polar and azimuthal angles from the detector data without rotations, according to some embodiments.

FIG. 16 is a flowchart showing steps of an exemplary method for calculating the azimuthal and polar angles from the detector signals, including several options shown in dash. In some embodiments, the sequence of steps may follow the arrows on the left side of the page, starting with 1601, acquisition of detector signals at a particular orientation of the system, including side detector and front detector detection data. After accumulating detection data for a predetermined integration time, or at any time, the data can be corrected 1602 for the different efficiencies of each detector, for example to compensate for manufacturing variations or different threshold settings. Also, any events in which more than one side detector registers a signal at the same time may be rejected, either at this point 1602 or during acquisition 1601. Then 1603 the azimuthal angle can be calculated by interpolating between the two side detectors that have the highest detection rates (or the highest differentials), or by fitting the detection rates (or differentials) of all the side detectors to a source location model, or by another formula that relates the source azimuthal angle to the side detector data.

The polar angle can then be calculated. At 1604, the numerator of a ratio R can be calculated as the sum of the detection rates of all the side detectors as shown, or using another formula according to the side detector data. At 1605, the ratio R can be calculated as the numerator from step 1604 divided by the front detector rate as shown, or using another formula for the denominator according to the front detector data. Optionally, the result may be further modified for calculational convenience or for improved accuracy in particular embodiments, such as by squaring or taking the square root or other function of R.

Then at 1606, R is compared to two different angular correlation functions, one corresponding to an azimuthal angle of zero degrees and the other at an azimuthal angle of 180/N where N is the number of side detectors. When N=4, the second angular correlation function is at an azimuthal angle of 45 degrees, and for N=6, the second azimuthal angle is 30 degrees, for example. Thus one of the angular correlation functions corresponds to a plane passing through the centroid of one of the side detectors, and the other angular correlation function corresponds to a plane passing through the interface between two side detectors. The two angular correlation functions are generally different due to azimuthal anisotropies, or different detection efficiencies for sources at different azimuthal angles. As mentioned, the angular correlation functions may be prepared by measuring the front and side detector rates of a prototype system while a test source is moved around various polar angles. For one of the angular correlation functions, the test source may be placed at various polar angles with the azimuthal angle aligned with the center of one of the side detectors, and for the other angular correlation function, the test source may be placed at various polar angles in a plane aligned with the interface between two of the side detectors. Alternatively, a simulation program such as MCNP or GEANT may be used to calculate the individual detector response when a simulated source is placed at various polar angles, with an azimuthal angle of either zero degrees or 45 degrees (for a four-side-detector system). The front and side detector rates are noted, and the ratio R is calculated from those detection rates. The angular correlation function may then be the set of values of R along with the corresponding source polar angle.

When the ratio R is compared to the two angular correlation functions separately at step 1606, each angular correlation function provides a separate "candidate" value of the polar angle. The processor can then 1607 interpolate between those two candidate values according to the azimuthal angle of the source, which was already determined at step 1603. The resulting polar angle determination thereby eliminates the detection anisotropies of the detectors to high order. Therefore, the interpolation may provide a polar angle determination in this way that may be accurate throughout the azimuthal range of 0-360 degrees and polar range of 0-90 degrees, according to some embodiments. Finally at step 1608, the azimuthal and polar angles may be displayed, transmitted elsewhere, stored locally, used to redirect a light beam or a camera image, emblazoned upon that camera image at the source location, or otherwise reported according to the application requirements.

The method includes several optional variations shown in dash. At 1609, after determining the detection rates of the side detectors, a set of differentials can be calculated, each differential equaling the detection rate of one side detector minus the detection rate of the diametrically opposite side detector, thereby obtaining a zero-based differential. (Using a differential instead of the actual detector rates may enhance the contrast between side detector signals, in some cases.) If the number of side detectors is odd, then the differential may equal the difference between one side detector rate and the average of the two nearly-opposing side detector rates, respectively. Then the differentials may be used in the interpolation step 1603 to evaluate the azimuthal angle. (However, the differentials are preferably NOT used in step 1604, calculation of the sum of the side detector data, since the sum of differentials is necessarily zero.) The option of using differentials for the azimuthal angle determination is generally beneficial when the blocking fraction is high, such as greater than about 60%. However if the blocking fraction is low, such as below about 40%, the penetration of particles through to the opposite side detector may affect the angular response; hence in designs with low blocking fractions, the side detector rates may preferably be used instead of the differentials for calculating the azimuthal and polar angles.

After determining the azimuthal angle in step 1603, as an option, the numerator may be calculated 1610 by taking the highest side detector rate (or the highest side detector differential), and adding the second-highest rate or differential times a geometrical factor G. The geometrical factor is a first-order correction for the detection anisotropies, and usually is optimal in the range of 0.05 to 0.20, with values in the range of 0.10-0.12 being most common. Artisans can determine the value of G for a particular system design by measuring the detector rates and calculating R with a test source positioned at azimuthal angles of zero and then at 45 degrees, and adjusting G so that the resulting two values of R are equal. With the detector anisotropies thus canceled, the resulting value of R is substantially independent of the azimuthal angle, and therefore a single angular correlation function may be sufficient to localize a source irrespective of the azimuthal angle, at step 1611.

Alternatively, the angular correlation function may include polar angle values corresponding to various values of R and various values of the azimuthal angle. Then, after determining the azimuthal angle from the side detector data, the polar angle can be determined from the angular correlation function with the anisotropies largely canceled, since the azimuthal effects are already included in the function.

To summarize the flowchart of FIG. 16, the azimuthal angle can be calculated by interpolating between the side detector rates or their corresponding differentials; the numerator can be calculated as the sum of all the side detector rates, or as the highest rate plus G times the second-highest rate to cancel anisotropies, or as the highest differential plus G times the second-highest differential, with G being adjusted so that the zero-degree and 45-degree values are equal. In the polar angle determination, the numerator can be the sum of the side detector rates or other function of the side detector data, while the two angular correlation functions (corresponding to azimuthal angles of zero and 45 degrees when N=4) may be interpolated to obtain the final, anisotropy-corrected polar angle. Alternatively, a single angular correlation function can be used to determine the polar angle, optionally using G to correct anisotropies as mentioned. Or a comprehensive angular correlation function can be used that includes both the ratio R and the azimuthal angle to determine the polar angle. For most system designs and most source angles, the various options shown in FIG. 16 produce similar results. Artisans can select the analysis options that are most convenient for their particular system.

Figure 17:
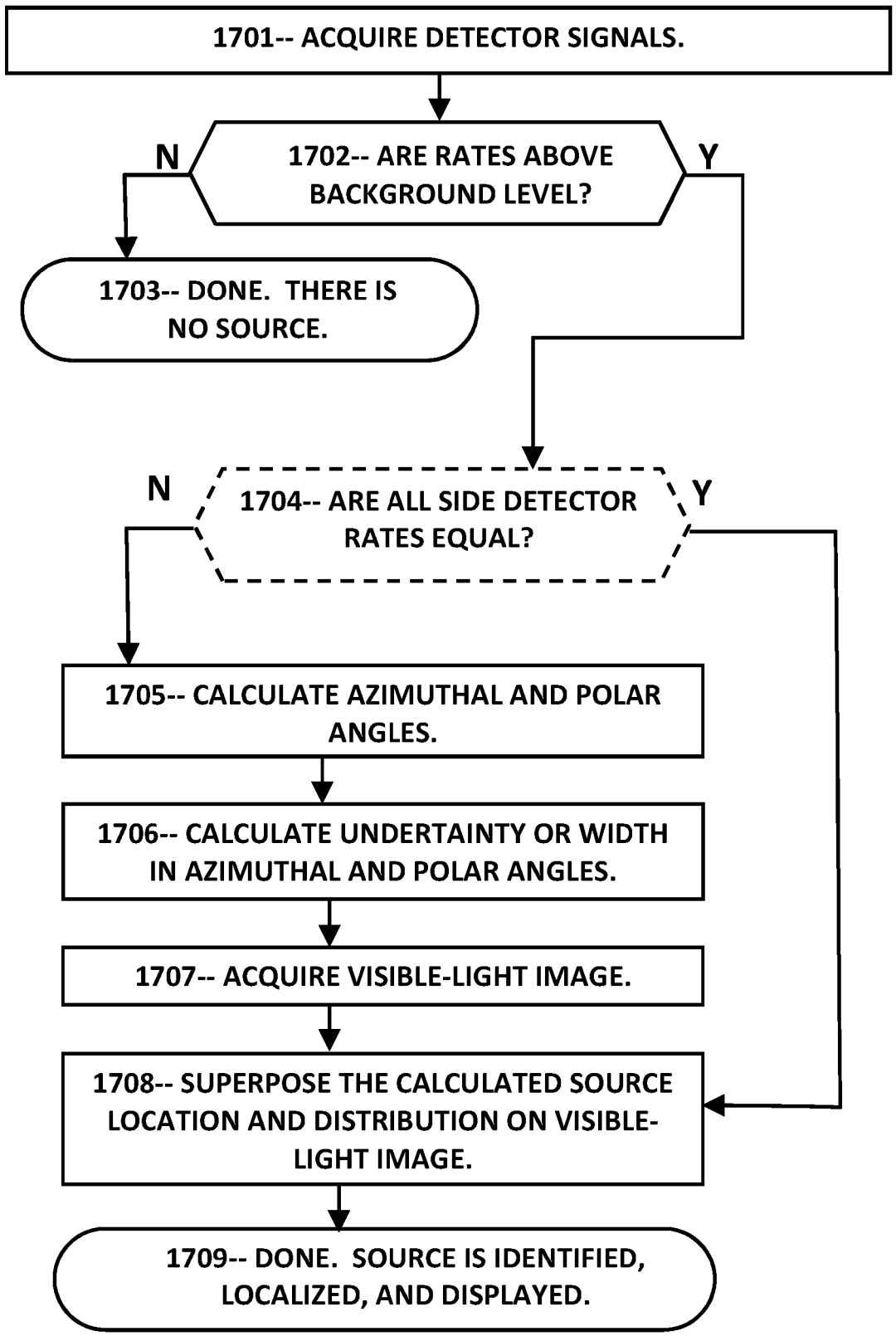
FIG. 17 is a flowchart showing steps of an exemplary method for producing a composite image indicating the location of the source, according to some embodiments.

FIG. 17 is a flowchart showing steps of an exemplary method for preparing an image that indicates where a source is located in an inspection scene. First 1701 detection signals from the side and front detectors are acquired. The rates may be checked against the expected or normal background levels 1702, for example by adding the detection rates of all the detectors and comparing to a predetermined background rate. If the total rate is normal, there is no source present, or at least no source has yet been detected, and the method is done at 1703. If the rates are above background, then optionally (in dash, 1704), the side detector rates can be checked to determine if they are all equal to within expected statistical variations. If the are not equal, the system can then 1705 calculate the azimuthal angle of the source according to the distribution of side detector rates, and the polar angle according to the front detector rates, as discussed above. The system can also calculate 1706 the uncertainty in each angular determination according to the number of counts in each detector using, for example, Poisson statistics if the number of counts is low such as less than about 30, or Gaussian statistics if the number is higher than 30 (or other threshold value).

Then 1707, or earlier, an image of the scene may be acquired, using for example visible light or infrared or other wavelength range. If a source is detected, its calculated direction can be indicated 1708 on the image by, for example, placing an icon overlay or a density map or contours on the image, or other graphical means for indicating where the source was observed. Thus the position of the icon on the image corresponds to the polar and azimuthal angles calculated from the detector rates, so that the icon appears correctly registered relative to other items in the image. In addition, the uncertainties in the azimuthal and polar angles may be determined according to the detection data, and these uncertainties can be displayed on the image, for example by adjusting the width and height of the source overlay according to the uncertainties. For example, the source location may be indicated as an ellipse overlay, which is centered at the calculated source direction on the image, and the ellipse axes may be set according to the uncertainties in the polar and azimuthal angles. In a similar way, if the source is indicated as a density map or contour overlay, then its dimensions may be scaled according to the angular uncertainties, thereby informing an operator of the range of directions in which the source is likely to be found. As a further option, the source indicator may be colored or otherwise varied according to the rate of detections, or the type of particle detected, or other criterion.

Returning to the interrogator at 1704, if all the side detectors exhibit the same counting rates within statistical uncertainties, then the flow can proceed directly to the image processing step at 1708 since the source is then known to be aligned with the detector axis, that is, the polar angle is zero degrees and the azimuthal angle is irrelevant. Then 1709, after the composite image has been prepared and displayed (or stored or transmitted elsewhere), the task is done.

In some embodiments, the flow may return to acquire further detector data at 1701, and to update the polar and azimuthal angle determinations incrementally. For example, new detection data may be combined with earlier data by weighted averaging or a ring buffer calculation or other means for updating the angles with new detection data. Also, the uncertainties in the source angles can be adjusted, usually downward, as further counts are accumulated, and the source icon or the radiation distribution, shown on the image display, can be adjusted likewise. The scene image may also be updated whenever the operator moves the system, so as to continuously track rotations or other motions of the system. When the scene does shift, the direction of the source may be corrected automatically (that is, without waiting for more detection data) by moving the source icon overlay on the image, in the opposite direction to the perceived system rotation. The icon may thereby continue to be centered on the calculated source location after the system is rotated. In some embodiments, a compass or other direction-sensitive sensor can be included, and the source icon can be moved in response to changes in the system orientation as revealed by the compass or other sensor. Alternatively, without such a sensor, the processor may be configured to perform image analysis on items in the scene and thereby determine when and how far the system orientation has changed, and can then adjust the position of the source icon on the image accordingly to keep the source indicator centered on the detected source direction. As further detection data is accumulated, the source icon can then be adjusted accordingly, irrespective of any prior orientation changes in the system.

Figure 18:
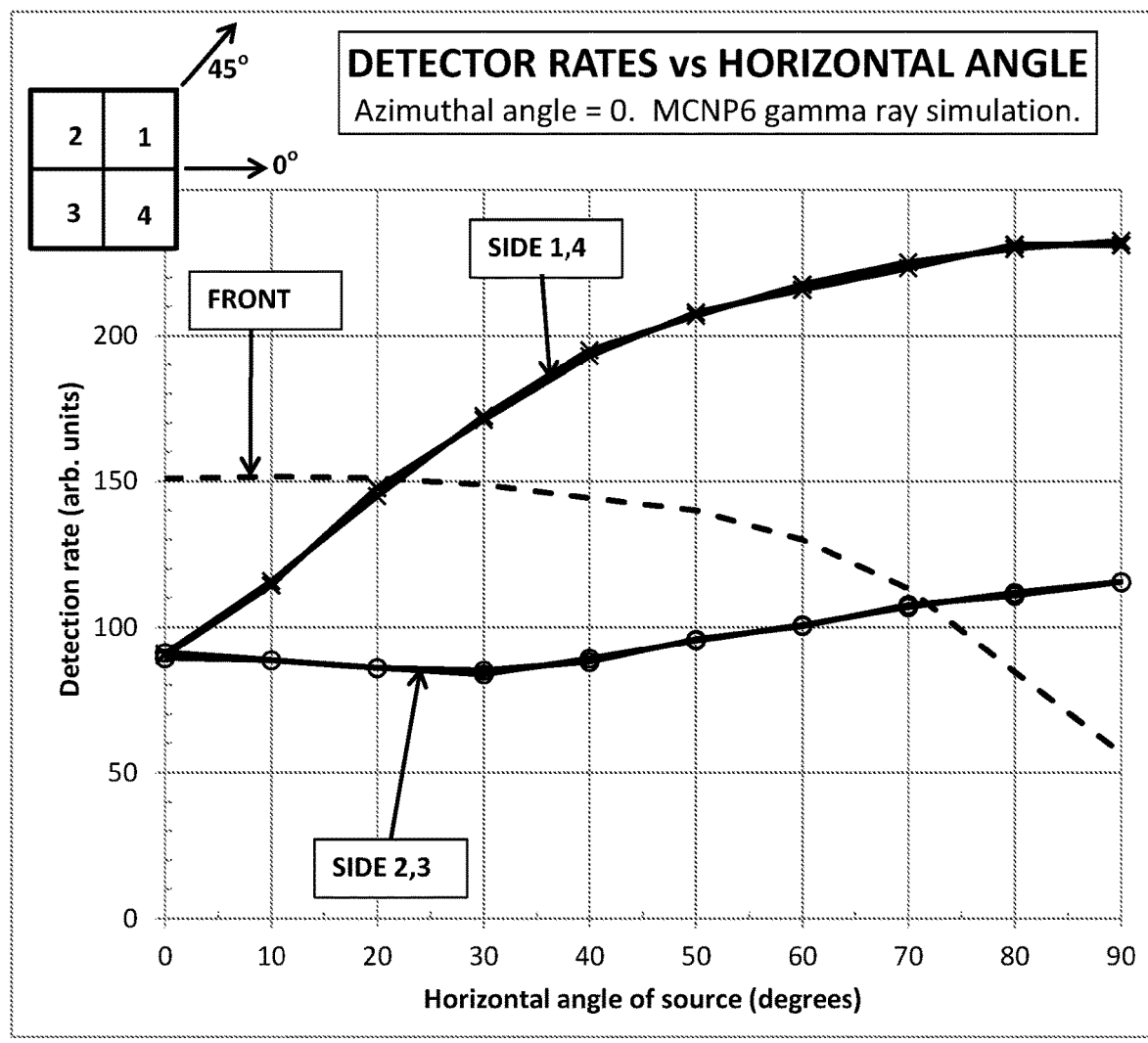
FIG. 18 is a graph showing the counting rates for an MCNP6 simulation of a gamma ray detector.

FIG. 18 is a graph showing the results of an MCNP6 simulation of an exemplary system to detect 1 MeV gamma rays from an isotropic source at a distance of 3 meters. The system was modeled after FIG. 1, with four side detectors of NaI measuring 5×5×16 cm and a BGO front detector measuring 10×10×1 cm. Each detector had a detection energy threshold of 100 keV. The simulated source was moved in the horizontal plane around the simulated detector, acquiring data at horizontal angles every 10 degrees from 0 to 90 degrees relative to the detector axis, with an elevation angle of zero. In spherical coordinates, this corresponds to a polar angle ranging from zero to 90 degrees, and the azimuthal angle of zero. The graph shows the counting rates, in arbitrary units, of the four side detectors according to the numbering shown in the inset drawing. The counting rates in side detectors 1 and 4, shown as the lines with "x" data points, have high detection rates since the source is on the same side of the system. Side detectors 2 and 3, shown as the lines with "o" markings, have lower rates since the source is on the opposite side. The dashed curve shows the front detector counting rate, which is maximum when the source is in front of the system and declines at high angles. The shape of the front detector curve is due to the front detector width-to-thickness ratio, which was 10 in the simulation.

The two side detectors numbered 2 and 3 have nearly the same counting rate since they are equally exposed to the source when the azimuthal angle is zero. Likewise, the two side detectors 1 and 4 show statistically the same response for the same reason. At a polar angle of zero degrees, all four side detectors show nearly the same detection rate, since the system is directly aimed at the source in that case. As the source is moved horizontally away from the detector axis, the near-side detectors (1 and 4) increased in detection rate as expected, while the far-side detectors (2 and 3) remained substantially lower. At the highest polar angles, the far-side detectors do not drop to a very low detection rate in this case, because the simulated system was intentionally made compact, with a blocking fraction of only about 50%. Nevertheless, the contrast is sufficient to determine the azimuthal and polar angles of the source.

Figure 19:
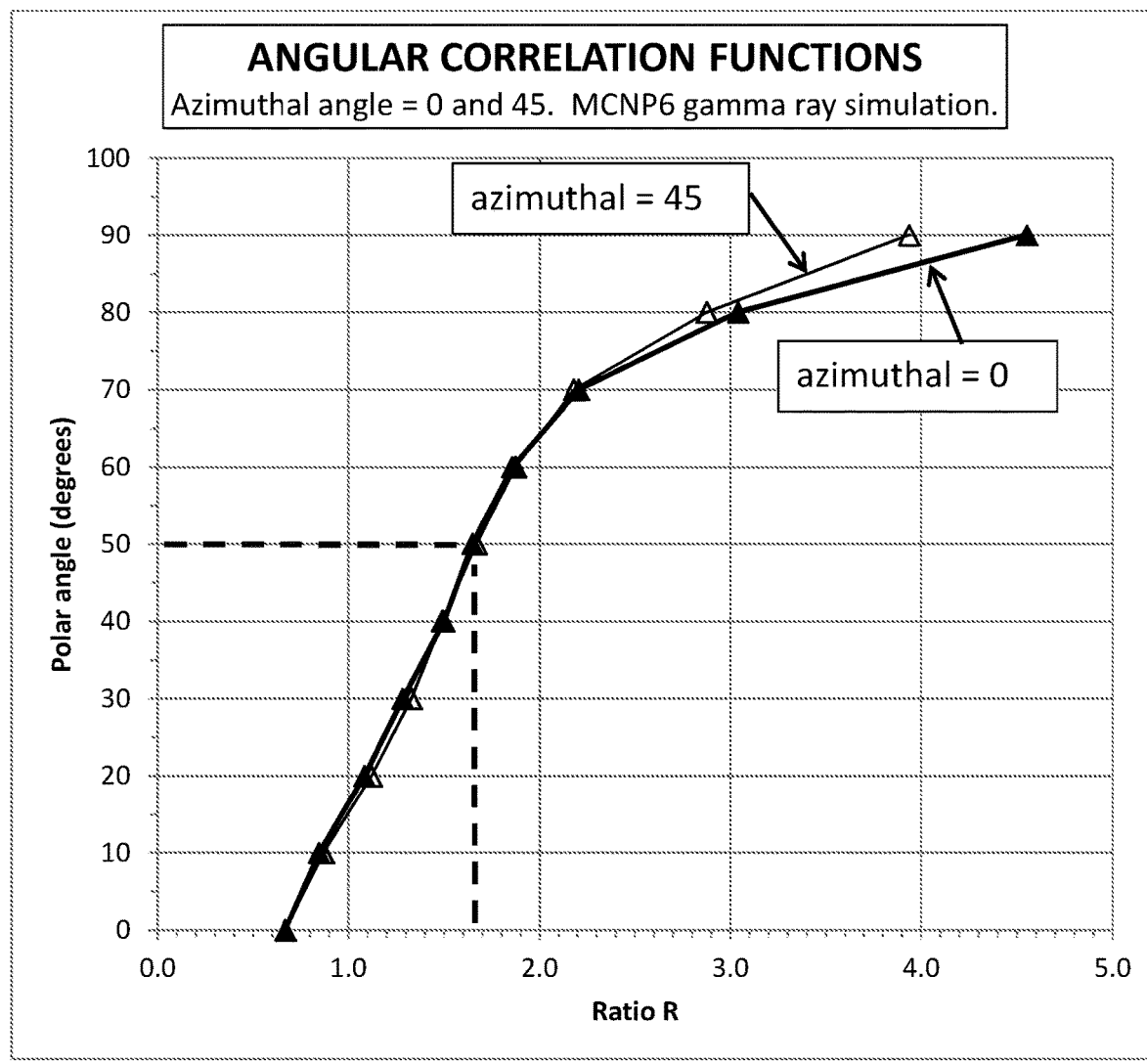
FIG. 19 is a graph showing the angular correlation function that relates the polar angle to the detector counting rates for the simulation of FIG. 18.

FIG. 19 is a graph showing the angular correlation function, derived from the data of FIG. 18, as the heavy curve labeled azimuthal=0. The graph shows how the polar angle is related to the ratio R, calculated in this case as the sum of side detector rates divided by the front detector detection rate, for a source at an azimuthal angle of zero degrees. The correlation is smooth and monotonic, and therefore allows the polar angle of the source to be determined from the ratio R directly. Since the curve is monotonic throughout the 0-90 degree range, it provides a unique correlation between R and the polar angle for sources at an azimuthal angle of zero degrees, and also at 90, 180, and 270 degrees by symmetry.

To check for anisotropies, the simulation was repeated but with the source at an azimuthal angle of 45 degrees, or diagonally relative to the detectors as indicated in the inset of FIG. 18. The thin-line curve of FIG. 19 labeled azimuthal=45 is the angular correlation function for sources positioned, at various polar angles, with an azimuthal angle of 45 degrees. The 45-degree curve also applies at azimuthal angles of 135, 225, and 315 degrees by symmetry. The two curves (azimuthal of zero and 45 degrees) are closely in agreement below about 80 degrees polar, but they diverge at the highest polar angles due to the anisotropic shape of the side and front detectors. In terms of R, the two curves diverge when R is greater than about 3.0. The corrected polar angle can be obtained at any azimuthal angle by interpolation between the two "candidate" values from the two curves shown. The interpolation is performed according to the known azimuthal angle of the source, which was already determined from the side detector data. In this way, the polar angle can be obtained at all angles, with the detector anisotropies corrected to high order.

To consider a specific example, a value of R=1.65, shown by a vertical dashed line, corresponds to a polar angle of 50 degrees as indicated, and is the same for both curves. At polar angles of zero to about 75 degrees, the angular correlation is independent of the azimuthal angle and no correction is needed. At high polar angles of 80-90 degrees, the anisotropy between the two curves is still relatively small, due to the low slope of the curves in that region, and results in at most a 4-degree variation in polar angle as the azimuthal angle is changed, which is sufficient for many applications. For other applications requiring higher precision, the anisotropy can be corrected by weighted averaging between the two curves according to the previously-calculated azimuthal angle. The weighted average thereby provides a precise value for the polar angle throughout the range of 0 to 90 degrees polar. Furthermore, with the addition of a back detector, the same method can locate a source in a full 4π solid angle coverage (azimuthal=0-360, polar=0-180), from data acquired at a single orientation of the system.

Figure 20:
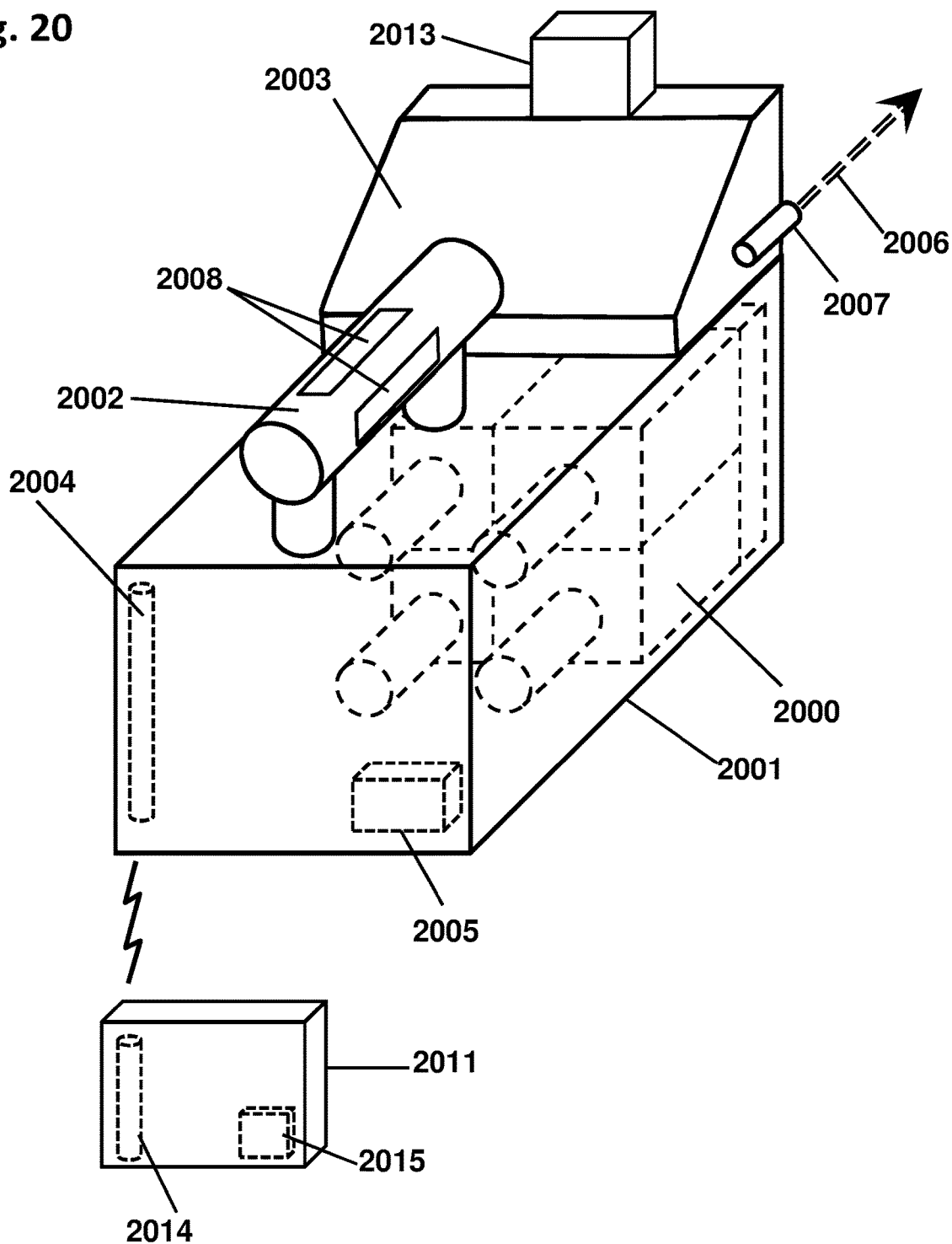
FIG. 20 is a perspective sketch of an exemplary directional hand-held survey meter, according to some embodiments.

FIG. 20 is a perspective sketch, partly hidden, of an exemplary hand-held survey meter 2001 that can determine the direction of a source in two dimensions. The meter 2001 may include a system 2000 (hidden lines in dash) such as that of FIG. 1, and a handle 2002 and a display 2003 controlled by a processor 2005. A camera 2013 is shown mounted on the meter 2001 and configured to generate images of the inspection scene. Typically, the operator holds the meter 2001 at some orientation, waits for a brief integration time, and then views the display 2003 which indicates the source location. In a first embodiment, the display 2003 can graphically show the calculated azimuthal and polar angles of the source (if present), and the operator can then rotate the meter 2001 into alignment with the source if desired. The operator can rotate the meter 2001 in the azimuthal direction as indicated in the display 2003, and can rotating more quickly or farther if the polar angle is large. The operator can stop rotating when the display 2003 indicates that the meter 2001 is aimed directly at the source. Thus the meter 2001 can enable rapid convergence to a source location by determining, and displaying, both the azimuthal and polar angles of the source in real time.

In a second embodiment, the display 2003 shows an image acquired by the camera 2013, with the source location indicated by an overlay for example, or a heat map or other graphical indicator positioned on the image according to the azimuthal and polar angles, so as to be correctly registered relative to items in the image. The image 1003 can thereby show which item in view contains the source. As before, the operator may wish to rotate the meter 2001 until aimed directly at the source, by rotating in the direction indicated by the icon on the image 2003.

In a third embodiment, the camera 2013 may be configured to redirect its viewpoint so that the calculated source location is centered in the image 2003. This option may be most convenient for fixed-site inspections as opposed to portable applications. With the image 2003 so adjusted, the camera 2013 can zoom in or out, producing either magnified or wide-angle views of the scene, while remaining centered on the calculated source location.

In some embodiments, the meter 2001 may have a light emitter 2007 that can emit a light beam 2006, which can be configured to indicate the azimuthal and polar angles visually as well. In a first version, the light beam 2006 may be aligned with the detector axis, thereby indicating where the meter 2001 is aimed. When the meter 2001 has been rotated into alignment with a source, the light beam 2006 thereby indicates where the source is found. The beam shape may be modified to indicate where the source is located, such as a wedge-shaped or arrow-shaped beam spot pointing toward the source. Alternatively, the beam 2006 may be redirected, using an optical beam deflector for example, to shine in the direction of the source according to the calculated polar and azimuthal angles. In that case, the beam spot may illuminate the source location, thereby visually showing the operator where the source is located. In addition, the beam 2006 may be caused to dwell persistently on the source location, regardless of any changes in the orientation of the meter 2001, by sensing those changes (using a compass for example) and correcting the beam direction accordingly. Thus the light beam 2006 may seem to be "locked on" to the source, thereby providing inspectors with a compelling visual indication of the source location. In addition, the light beam 2006 may also be flickered or otherwise modulated to further enhance visibility. The azimuthal and polar angles, and therefore the location of the beam spot, can be updated continuously or periodically as the meter 2001 is moved around. The shape of the beam 2006 may be adjusted, using further optical elements for example, to indicate the uncertainties in the polar and azimuthal angles.

In some embodiments, the meter 2001 may have four haptic indicators 2008 (two showing) mounted on the handle 2002. The haptic indicators 2008 may be activated according to the calculated azimuthal angle, thereby indicating to the operator tactically in what direction the source is located (for example, the right-side haptic indicator 2008 may be activated if the source is to the right). The haptic indicators 2008 may also be modulated so as to indicate the magnitude of the polar angle (for example, being modulated faster if the polar angle is large, and more slowly if the polar angle is small, or vice-versa). Also, when the detector axis is brought into alignment with the source, the haptic indicators 2008 may be activated in a characteristic way, such as all four haptic indicators 2008 being pulsed at once, or in a circular sequence, or otherwise indicate that the detector axis is aligned with the source. This would inform the operator of the source direction and the source alignment without the operator having to look away from the scene.

In some embodiments, the meter 2001 may include a wearable personal safety device 2011 comprising a multi-axis accelerometer 2015 and a radio transmitter 2014 which may be in communication with a transceiver 2004 in the meter 2001, or with an external receiver for example. The operator may wear the personal safety device 2011 using, for example, a belt clip or lanyard or other demountable attachment. Then, if the operator falls or otherwise is in trouble, the multi-axis accelerometer 2015 may detect a change in orientation and cause the transmitter 2014 to send a help request message. Thus the personal safety device 2011 is configured to transmit a message when an operator of the meter 2001 falls down.

Figure 21A:
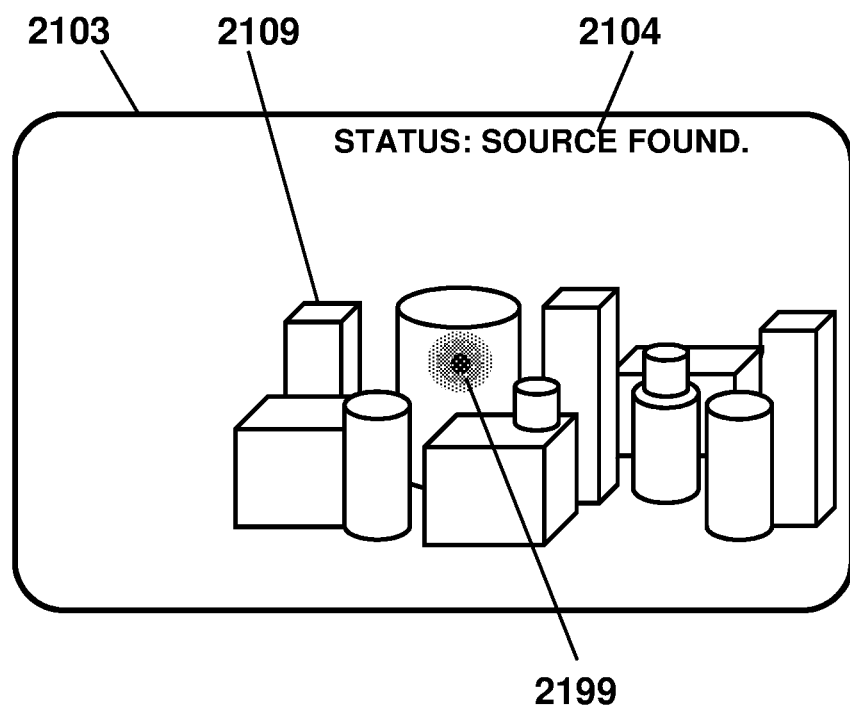
FIG. 21A is a sketch showing an exemplary image including a source location indicator, according to some embodiments.

FIG. 21A schematically shows an exemplary flat-screen display 2103, such as the display 2003 of FIG. 20. The exemplary display 2103 may be configured to show the visible-light or infrared image of the inspection scene, which in this case assorted cargo 2109, with the source location indicated by an overlay 2199 as described above. The camera in this case is configured to adjust its aiming direction or view, so as to center the image 2103 on the source location (when a source is present). Therefore the cargo 2109 is shown off-center and the source location indicator 2199 is shown at the center of the image 2103. When no source is present, a different overlay, or other indicator, or no indicator, may be displayed. Alternatively, or in addition, the image 2103 may include peripheral text or data 2104 indicating, for example, whether a source has been detected as well as other information.

Figure 21B:
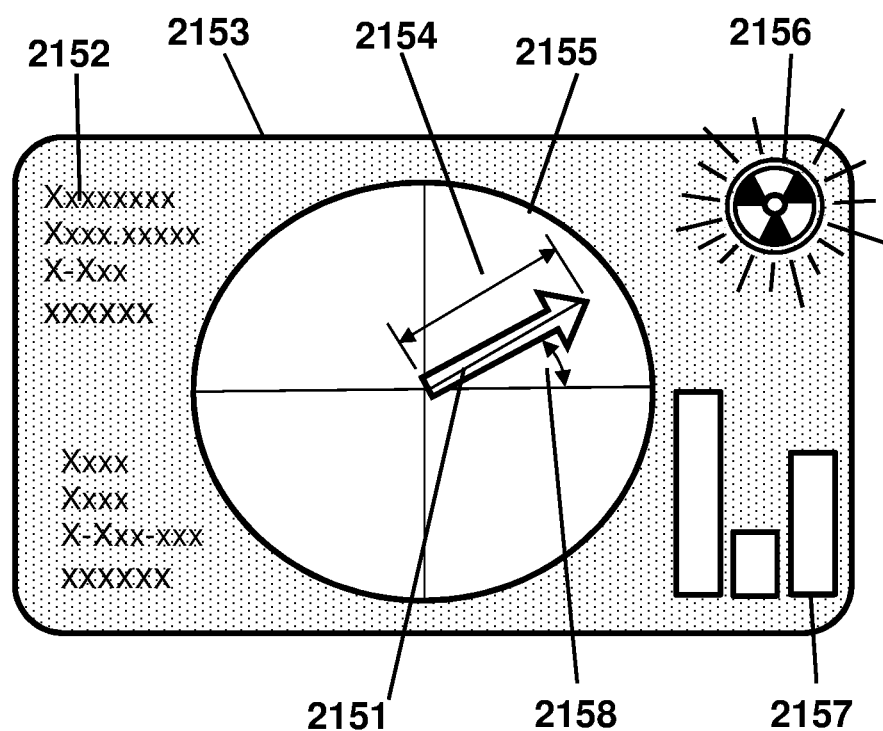
FIG. 21B is a sketch showing an exemplary flat-screen display showing the azimuthal angle and polar angle of the source, according to some embodiments.

FIG. 21B shows a second exemplary display 2153 in which the source angles are indicated explicitly. The display 2153 can include a rotatable asymmetric icon 2151 (such as an arrow or wedge icon) which points at an angle 2158 corresponding to the azimuthal direction of the source relative to the detector axis. The icon 2151 may also be configured with a length 2154 or other feature that indicates the size of the polar angle. The operator can then see from the shape and orientation of the icon 2151 where the source is located, and also how to move the system to bring the detector axis into alignment with the source. In addition, when the detector axis is aligned with the source, a non-directional icon 2155 (such as a circle) can be displayed or prominently modulated instead of the directional icon 2151. Two other widgets 2156 and 2157, such as bar displays and graphical alarms, can indicate other information such as the current radiation level or the integrated dose received or the presence of neutrons in the detected radiation. Further numerical or text information 2152 may also be displayed, such as the GPS coordinates, the accumulated dose, numerical values of the source angles, and the like.

As a further option, a portable system may have a plurality of LED's or other lamps arranged in a shape, such as a circle, and illuminated according to the azimuthal angle of the source, thereby indicating to the operator in what direction the source is located. The LED's can be flickered or their intensity adjusted to indicate the size of the polar angle, for example. And when the system is aligned with the source, the LED's may be illuminated in a characteristic way, such as all-on. If no source is detected, they may be all-off.

Figure 22A:
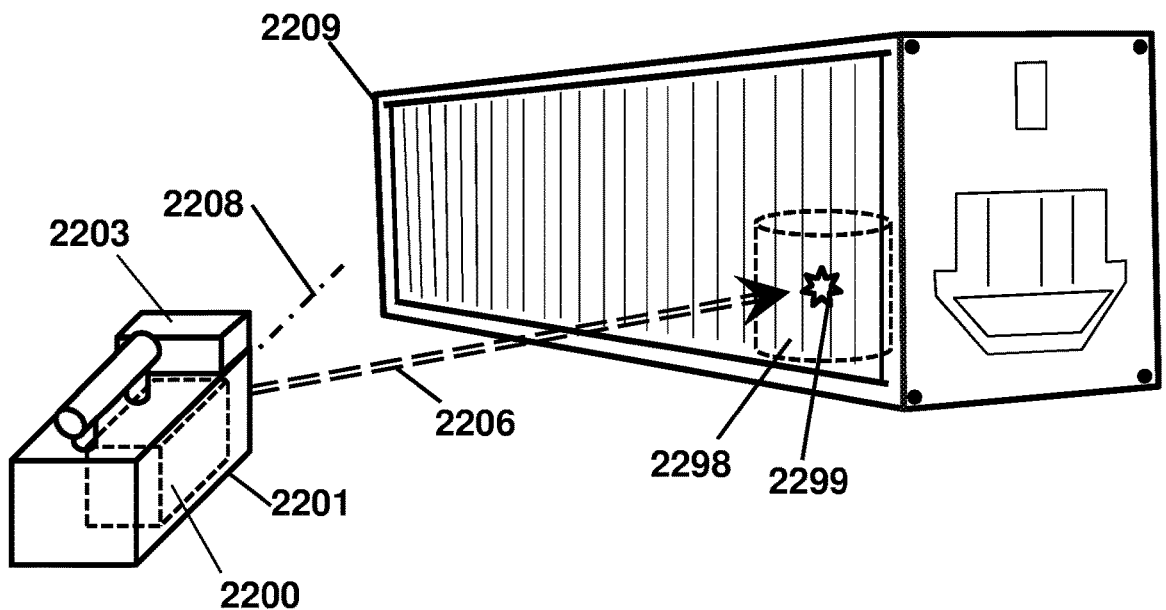
FIG. 22A is a notional sketch of a container inspection using a directional system, according to some embodiments.

FIG. 22A is a perspective sketch showing how an exemplary survey meter 2201, such as that of FIG. 20, containing a directional detector system 2200 such as that of FIG. 1, may detect and expose a nuclear weapon 2299 within a shield 2298 within a refrigerated steel shipping container 2209. An adversary has selected a refrigerated container 2209 to avoid detection since the frozen food that fills the container 2209 provides additional shielding, and also the thermal insulation of the container 2209 can conceal additional radiation shielding. In addition, any secondary inspection would be very difficult to perform when the container 2209 is tightly packed with frozen stuff. Despite these evasions, the meter 2201 has successfully detected the small amount of gamma ray or neutron radiation that escaped from the shield 2298, and has calculated the azimuthal and polar angles of the source 2299 relative to the detector axis 2208, and has indicated the source location on the display 2203, and has projected a light beam 2206 directly at the source direction, thereby exposing the threat.

Figure 22B:
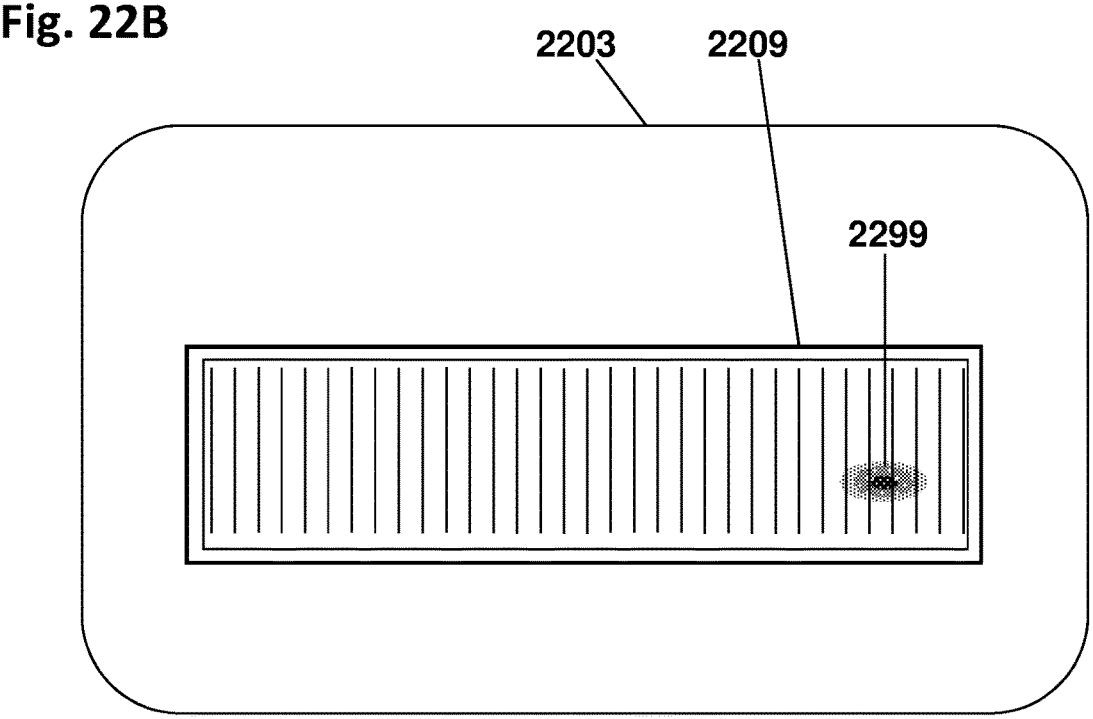
FIG. 22B is a sketch of an exemplary image of a cargo container with a source location indicator superposed, according to some embodiments.

FIG. 22B is an exemplary sketch of the display 2203 of FIG. 22A. Shown is the inspection container 2209 with the detected source indicator 2299 shown as an elliptical density map. The processor in this case is configured to calculate the uncertainties in the azimuthal and polar angles, based for example on the number of counts in the various detectors and/or on prior calibrations of the system. At the position of the source, the polar angle corresponds to the horizontal direction and the azimuthal angle corresponds to the vertical direction. The processor is further configured to render the source indicator ellipse 2299 with axes proportional to the uncertainties in the azimuthal and polar angles. The uncertainty in the polar angle is larger than the uncertainty in the azimuthal angle in this case, due perhaps to having fewer counts in the front detector. Accordingly, the horizontal axis of the ellipse 2299 is shown larger than the vertical axis, thereby indicating to an operator the region over which the source is likely to be found, as well as the uncertainties in the source angles. As further data are accumulated, the uncertainties may be reduced, and the displayed ellipse 2299 may be adjusted in position and reduced in size accordingly.

Figure 23:
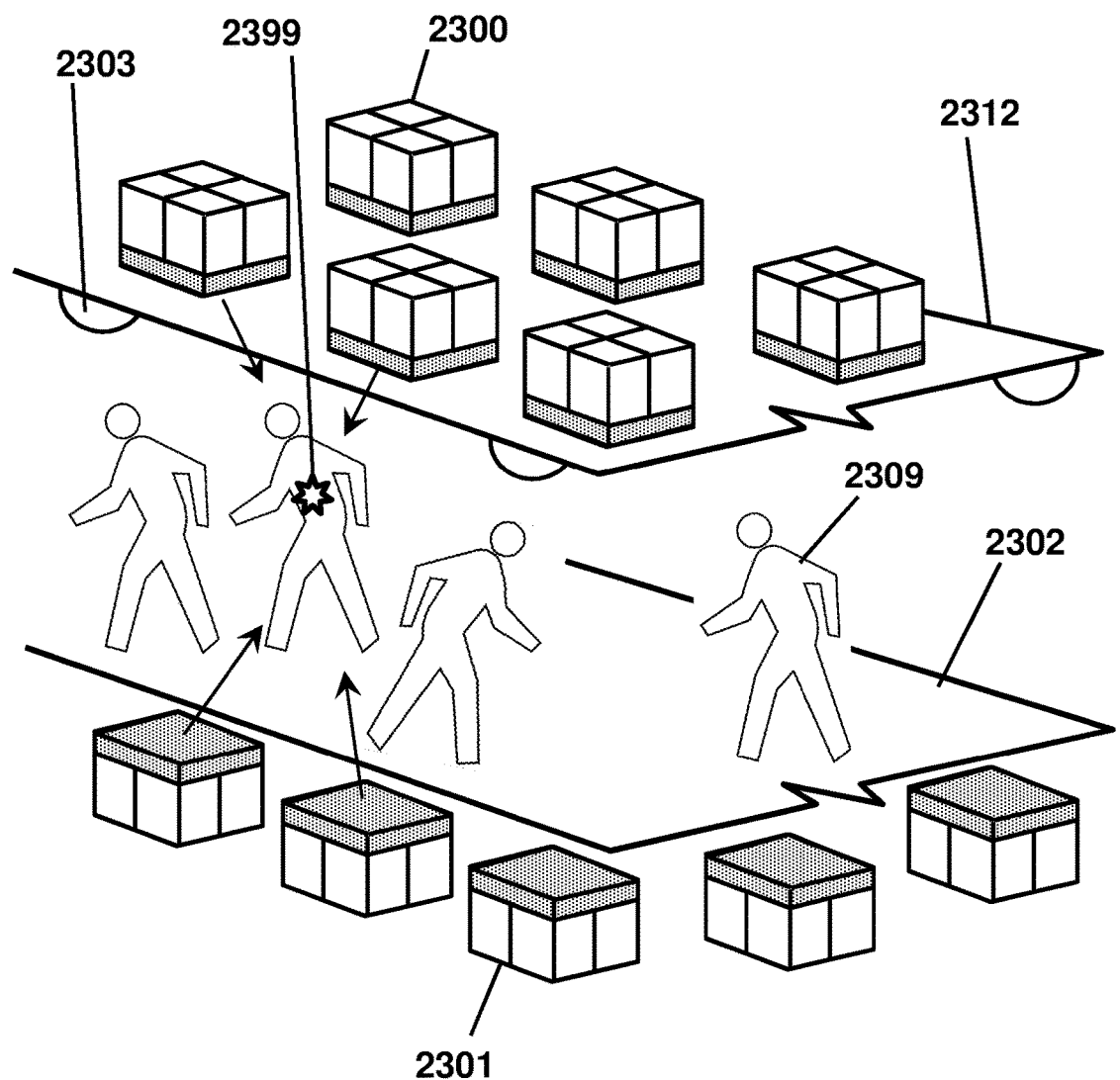
FIG. 23 is a notional perspective sketch of an exemplary array of systems arranged to scan passing pedestrians for radioactive material, according to some embodiments.

FIG. 23 is a notional sketch in perspective and partially cut-away, of an exemplary pedestrian scanner array to scan people 2309 passing through a walkway or hallway or other passageway, such as an airport or border crossing, where large numbers of people are to be scanned continuously for radiation sources. The walkway is demarked by a floor 2302 and a ceiling 2312. Above the ceiling 2312, numerous copies of the present system 2300 may be arranged pointing downward, while another set of the systems 2301 can be arrayed below the floor 2302 and pointing upward. One of the people 2309 has foolishly swallowed a source 2399 comprising a piece of SNM (special nuclear material) for clandestine transport, using his body as a neutron shield. However, the systems 2300 and 2301 have detected and localized the source 2399 as indicated by arrows. While each system 2300 or 2301 may detect just one or two extra particles, the combined data from all the systems 2300 and 2301 can detect and localize the source 2399, and determine the direction and speed of travel. Security cameras 2303 can simultaneously record the scene so that the person carrying the source 2399 can be uniquely identified by correlating the images with the directional data from the systems 2300 and 2301. For example, the location of the source 2399 can be determined according to the azimuthal and polar angles observed by the various systems 2300-2301, and can be superposed on images from the cameras 2303 to indicate which pedestrian 2309 is carrying the source 2399. The systems 2300-2301 may be configured to acquire detection data periodically, such as once per second, and to calculate a direction toward the source including the polar and azimuthal angles periodically, and to thereby determine the location of the source at a succession of times. Alternatively, the data from each of the side and front detectors of each of the systems 2300-2301 may be routed to a central computer and analyzed together using, for example, a maximum-likelihood moving-source model with variable speed and direction. Such a global fit may achieve greater sensitivity and accuracy than provided by each system 2300-2301 individually.

Figure 24:
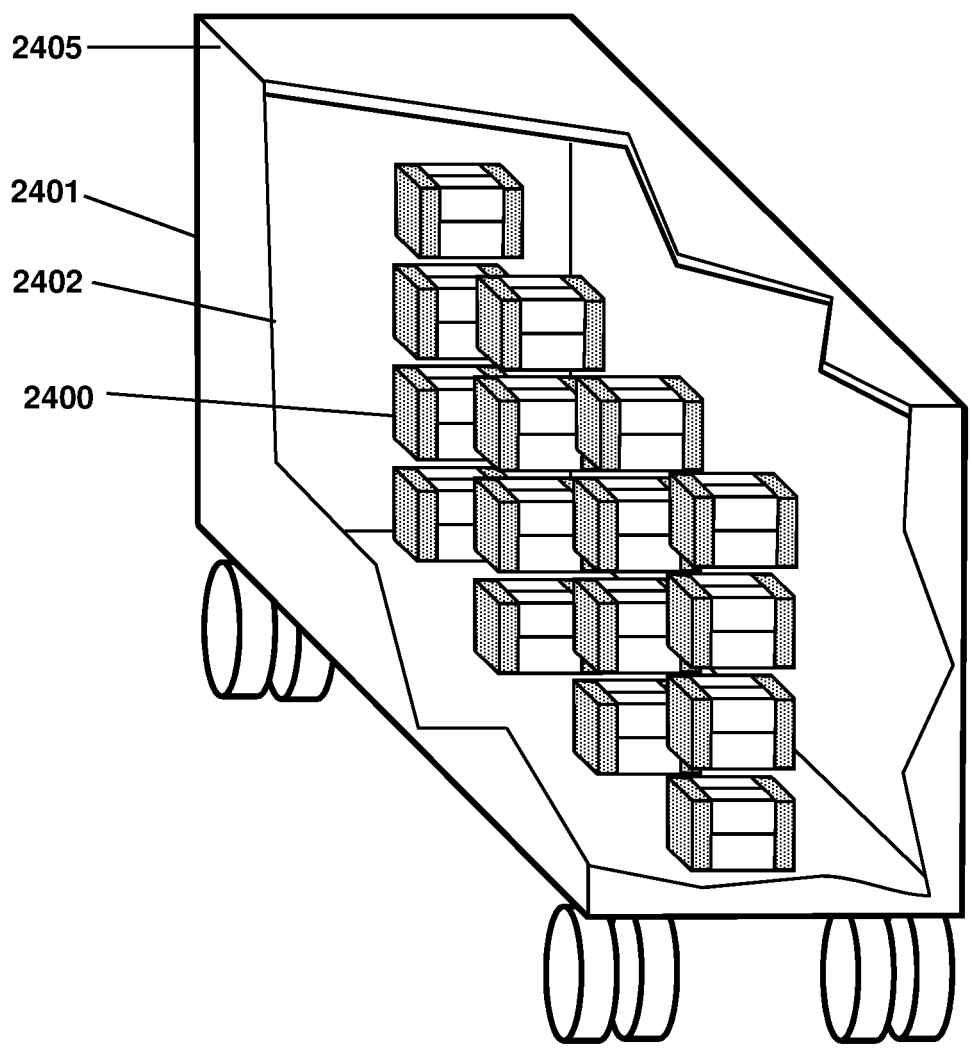
FIG. 24 shows in perspective an exemplary mobile area scanner, according to some embodiments.

FIG. 24 is a notional sketch in perspective, partly cut-away 2402, of an exemplary mobile area radiation scanner 2401 such as a trailer or van, incorporating an array of the present systems 2400, according to some embodiments. Preferably the systems 2400 are of the double-ended type as shown in FIG. 10, which simultaneously scan for hidden sources on both the left and right side while the mobile area scanner 2401 is either stationary or in motion. The systems 2400 may be spaced apart to minimize mutual shadowing, although this may not be a major concern because a hidden source is unlikely to be buried in the road in front of the mobile area scanner 2401. However, if a weapon really is hidden in the roadway, the lowest rank of systems 2400 can detect the threat when the mobile scanner 2401 passes over it.

The systems 2400 may be configured for gamma ray detection or neutron detection according to some embodiments. Alternatively, some of the systems 2400 may be of each type for simultaneous scanning of both gammas and neutrons, using pulse-shape discrimination for example. Very high sensitivity can be obtained by analyzing the several systems 2400 together, so that a weak or well-shielded source can be detected even when each individual system 2400 detects only one or two particles above background. The array as a whole can yield a statistically significant increase, consistent with a particular source direction. The motion of the area scanner 2401 can provide a range of viewpoints as it travels through the area, so that a source can be localized in three dimensions by triangulation, or alternatively by fitting the detection data to a source model, or other suitable analysis. Optionally, a sheet of scintillator 2405 (such as plastic scintillator) may be mounted on the ceiling to reject cosmic rays according to some embodiments.

Figure 25:
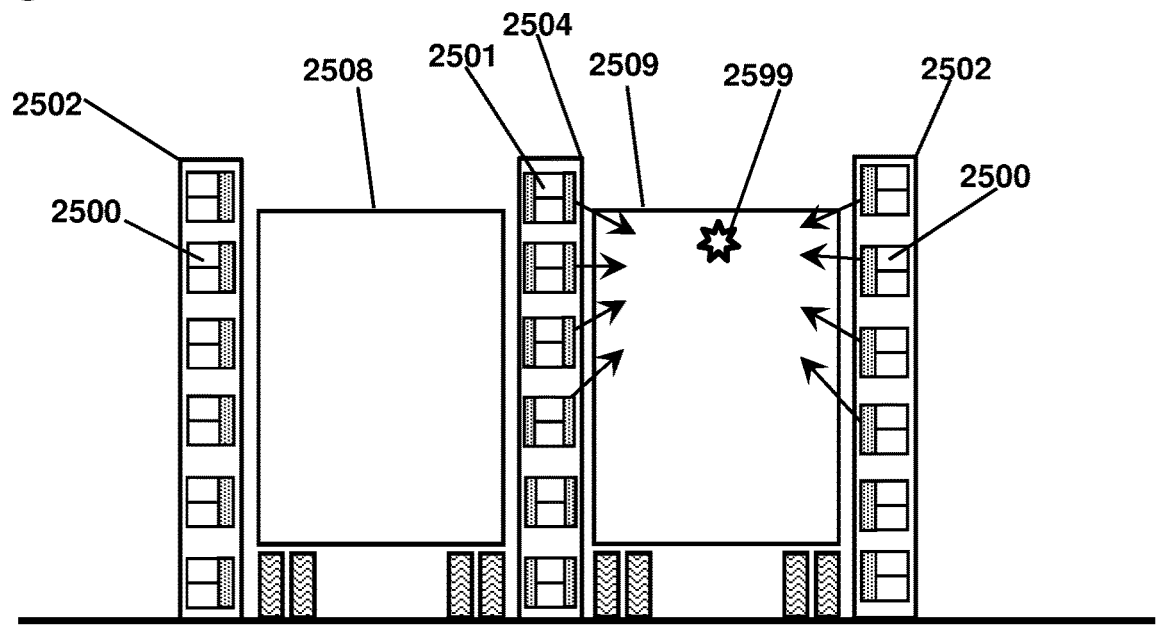
FIG. 25 shows an exemplary vehicle scanner facility, according to some embodiments.

FIG. 25 is a sketch of an exemplary drive-through vehicle inspection station comprising two side columns 2502 and a central column 2504 according to some embodiments. Each side column 2502 may contain an array of systems 2500 such as that of FIG. 1, while the central column 2504 may contain an array of the double-ended detection systems 2501 such as that of FIG. 10, to scan both sides simultaneously. A first truck 2508, which does not contain a threat, and a second truck 2509, which contains a shielded nuclear weapon 2599 mounted near the ceiling, are being scanned simultaneously. Radiation escaping from the shielded weapon 2599 is detected in the systems 2500 and 2501, which then calculate the direction of the weapon 2599 relative to each system 2500 and 2501. The calculated directions are indicated by arrows. Using data from the entire array, a central computer can use triangulation to determine the exact three-dimensional location of the weapon 2599.

Figure 26:
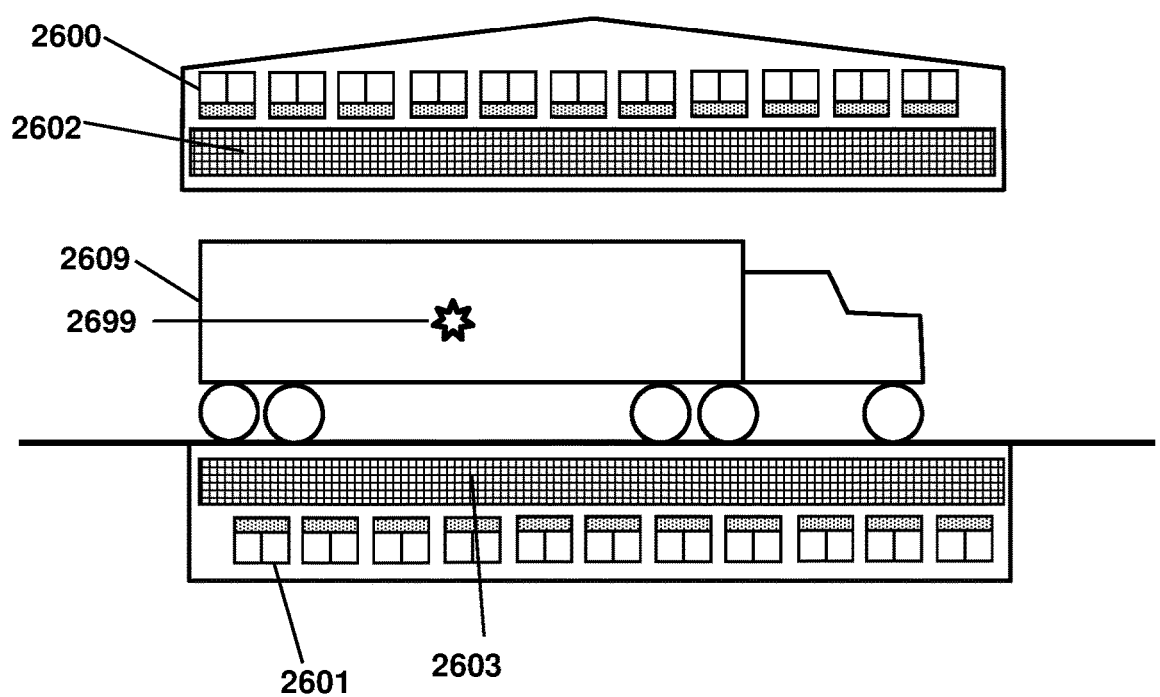
FIG. 26 shows an alternative vehicle scanner facility, according to some embodiments.

FIG. 26 is a sketch of an exemplary drive-through vehicle and cargo scanner configured to detect nuclear material both by radiation detection and by cosmic ray scattering. Cosmic rays, primarily GeV-level muons from the sky, scatter in a characteristic way in the high-Z material of a nuclear pit and its high-density shielding. Thus the facility includes an overhead muon tracking chamber 2602 and an underground tracking chamber 2603 that, together, detect high-angle scattering of cosmic rays, and thereby detect nuclear weapon materials. The upper chamber 2602 measures the track of a cosmic ray before it enters the inspection zone, and the lower chamber 2603 measures the track after passing through the inspection zone. Thus the tracking chambers 2603 and 2602 can detect a weapon or its shield by measuring the difference in track directions above and below the inspection zone.

The facility further includes an array of directional systems 2600, such as that of FIG. 1, above the upper cosmic ray tracker 2602, and second array of the directional systems 2601 under the lower cosmic ray tracker 2603 and pointing up. The detector systems 2600-2501 can detect and localize a threat 2699 in a truck 2609 by radiation detection, while the cosmic ray trackers 2602-2603 detect the threat 2699 by scattering. Advantageously, the detector systems 2600 and 2601 may be positioned outside the cosmic ray tracking chambers 2602-2603 to avoid causing additional scattering of the cosmic rays. In addition, the cosmic ray tracking chambers 2602-2603 generally comprise light, thin, low-Z materials such as aluminum tubing, through which gamma rays and neutrons readily pass. Thus the two inspection systems avoid interfering with each other, while both systems scan for nuclear contraband.

Synergy is a big advantage of the combined inspection. If an adversary tries to reduce the emitted radiation signature by adding more shielding around the weapon 2699, the cosmic ray scattering signature is increased and the weapon can be more easily detected by the tracking chambers 2602-2603. And if the adversary tries to reduce the cosmic ray scattering signature by reducing the amount of shielding, the directional systems 2600-2601 can more easily pick up the radiation. Thus the combination of the two detection modes leaves an adversary with no design space for avoiding detection.

Figure 27A:
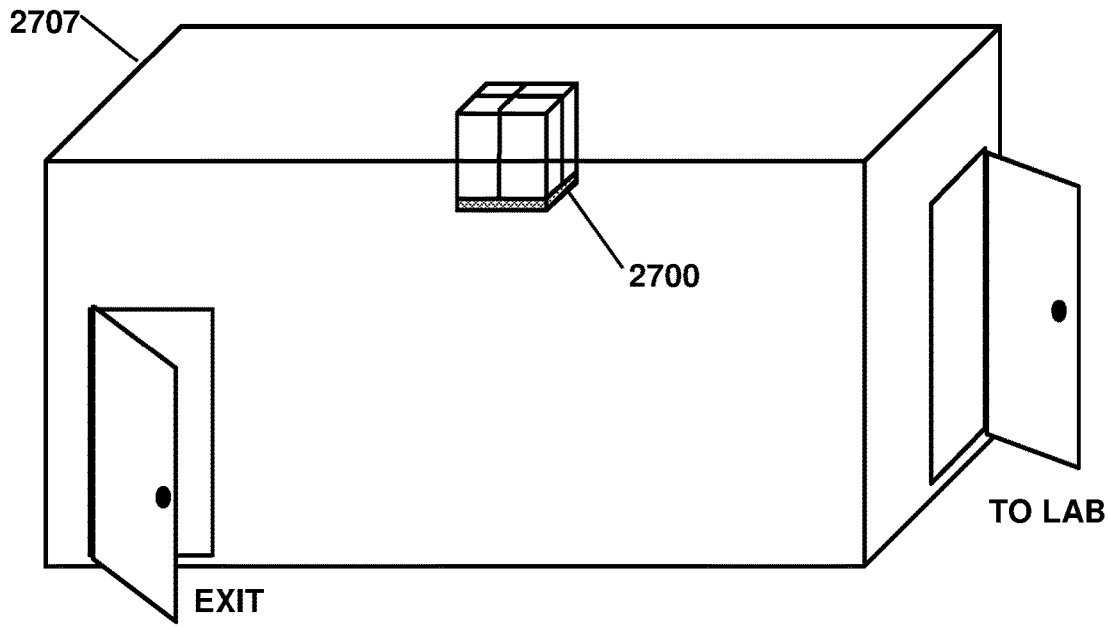
FIG. 27A is a sketch of an exemplary system configured to monitor a room, according to some embodiments.

FIG. 27A is a sketch in perspective of a room containing an exemplary directional radiation monitor 2700 according to the present disclosure, mounted on the ceiling of the room 2707. The monitoring is necessary because the room 2707 is a passage between a laboratory doing nuclear research and the outside world, as indicated by two doors labeled "to lab" and "exit" respectively. The room 2707 thus comprises a passageway that people can pass through to go into and out of the laboratory. The monitor 2700 may be configured to detect radioactive contamination, pilfering, and other problems by detecting a radioactive source nearby and measuring its location versus time.

Figure 27B:
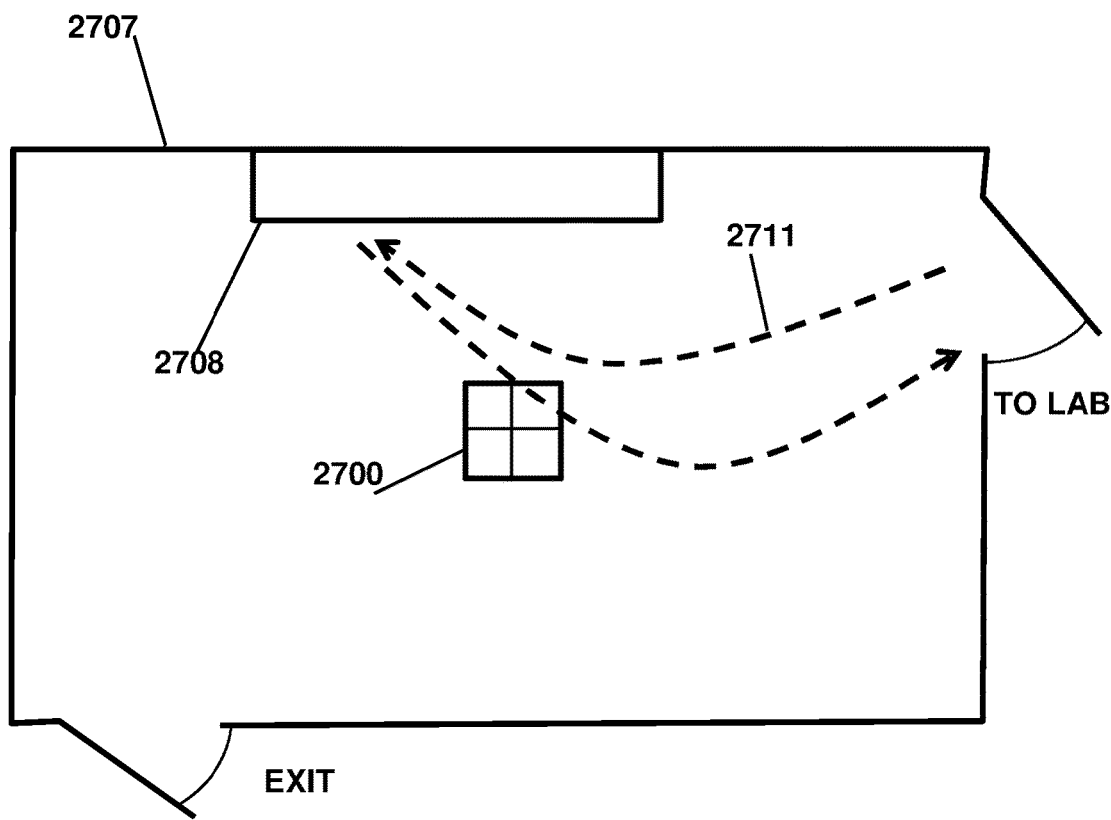
FIG. 27B is a top-view sketch of the room of FIG. 27A including a computed path of a source, according to some embodiments.

FIG. 27B is a top-view sketch of the room 2707 of FIG. 27A, showing the "to lab" and "exit" doors as well as the directional monitor 2700 from the top. Also shown is a shelf 2708 containing tools that workers can access. In the depicted example, a radiation event has occurred involving an unexpected radiation signature in which the detection rates increased and then decreased, just as if someone had taken a source from the lab to the exit door. If a non-directional detector had reported this incident, it would have appeared to be pilferage. But with the directional monitor 2700, an entirely different explanation emerged. The dashed lines 2711 show the trajectory of the source as measured by the directional monitor 2700, as a worker moved through the room 2707. The monitor 2700 was configured to detect radiation and to calculate the azimuthal and polar angles of the source of radiation periodically and to record those values in non-transient memory, thereby localizing the source in two dimensions at a large number successive times. From that data, the correct interpretation of the event was determined. A worker came into the room 2707 from the lab, selected a tool from the shelf 2708, and returned to the lab. Thus no pilferage occurred at all. Instead, a more serious problem was exposed, namely that the worker had been contaminated by radioactive material, and that is why the directional monitor 2700 registered radiation. By recording source directional information in real-time, the directional monitor 2700 enabled inspectors to determine the correct cause instead of a false alarm, and more importantly to assist the contaminated worker.

Figure 28A:
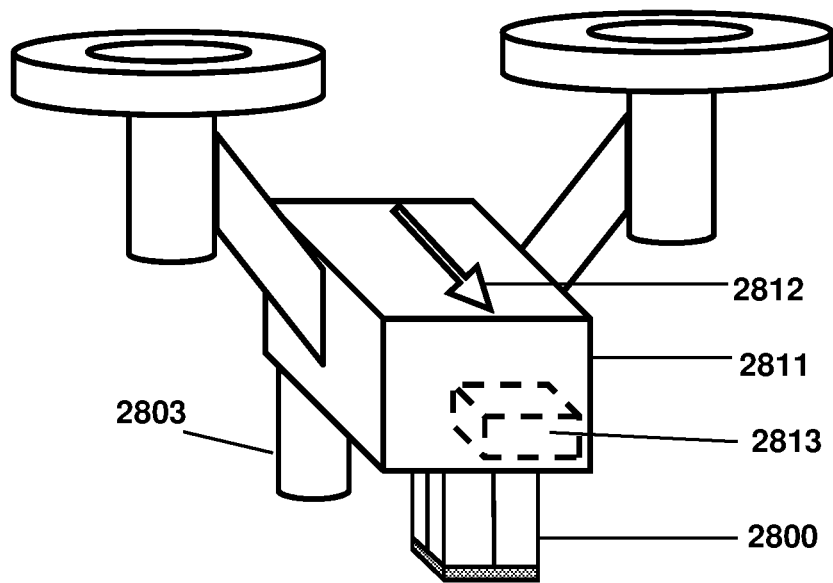
FIG. 28A is a perspective sketch of an exemplary system mounted on a drone, according to some embodiments.

FIG. 28A is a sketch of an exemplary drone-mounted directional radiation inspection system. A drone is a remotely-operated or autonomous or semi-autonomous unoccupied airborne vehicle such as a gasoline-powered model airplane, a battery-powered multi-rotor helicopter, a propeller-driven or jet-powered airplane, a hovercraft, a balloon or blimp or other lighter-than-air vehicle, or other unoccupied airborne craft. A directional detector system 2800 according to the present disclosure is mounted under a small battery-operated radio-controlled aircraft or drone 2811. An arrow 2812 indicates a frontward direction. A down-facing camera 2803 is also shown. Inside the drone 2811 is an electronics package 2813 comprising a GPS receiver or an electronic compass or an altimeter or a 3-axis accelerometer or a digital processor or other electronics. The directional detector system 2800 is configured to detect radiation from a source in an inspection region which is generally below the drone 2811, such as on the ground, on a roof, in a smokestack, or on a ground vehicle (such as a car, truck, train, boat, etc.) and to measure the polar and azimuthal angles of the source relative to the drone 2811, and to determine a direction toward the source in two dimensions such as the polar angle relative to the vertical, and an azimuthal angle relative to the frontward direction 2812. The drone 2811 may be further configured to acquire an image of the inspection region using the camera 2803, and the electronics package 2813 may be configured to add an icon to the image according to the azimuthal and polar angles as determined by the directional detector system 2800, thereby indicating where in the inspection region the source is located. The image, including the source location icon, may be transmitted wirelessly to a receiver elsewhere.

In addition, the electronics package 2813 may be configured to determine the location of the source in geographical coordinates. First, the electronics package 2813 may determine the frontward direction 2812 of the drone 2811 relative to magnetic north or true north or other external coordinate system, using a compass for example, and the altitude of the drone above the ground using a laser altimeter for example. The electronics package 2813 may be further configured to add the orientation angle of the drone 2811 to the azimuthal angle determined by the directional detector 2800, and thereby calculate the angle of the source relative to the external coordinate system. The electronics package 2813 may be further configured to determine the altitude of the drone 2811, and to calculate the horizontal distance of the source from the drone according to the altitude and the polar angle as determined by the directional detector system 2800. Then, using the drone coordinates (from GPS for example), and the horizontal distance of the source, and the angle of the source relative to the geographical coordinates, the electronics package 2813 may calculate the coordinates of the source, and transmit them to a ground-based receiver. Thus the drone-mounted directional detector can indicate the location of the source both pictorially in an image and numerically in geographical coordinates.

Figure 28B:
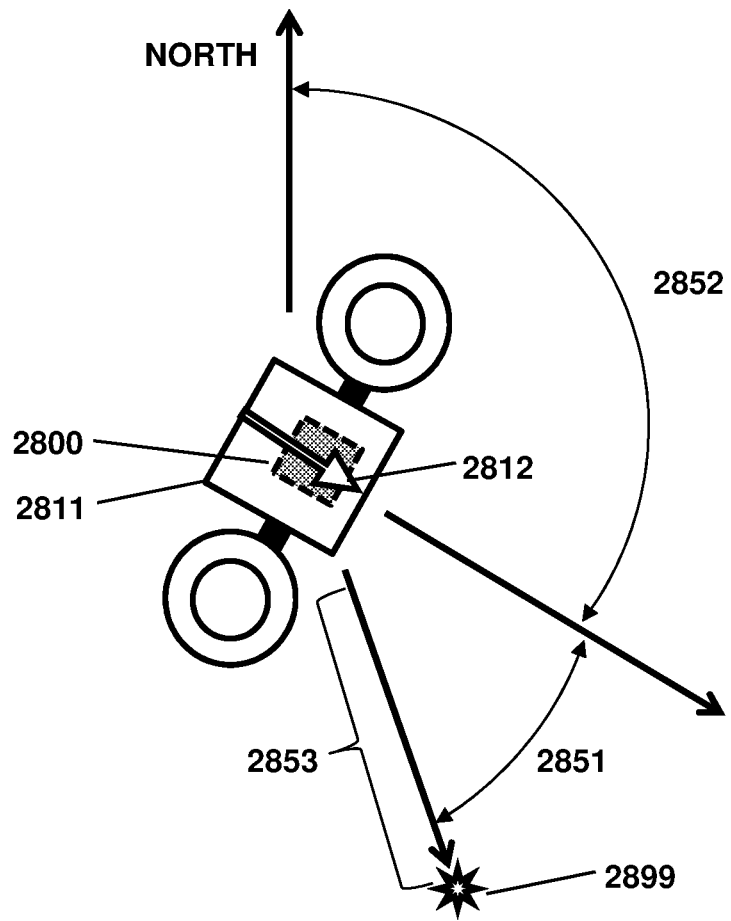
FIG. 28B is a top-view sketch of a drone including an exemplary system, according to some embodiments.

FIG. 28B is a notional top-view sketch of an exemplary drone 2811 including a directional detector system 2800 (under, in dash) and a source 2899. The azimuthal angle of the source 2899 relative to the frontward direction 2812 of the drone 2811 is indicated as 2851, and the orientation angle (or bearing) of the drone 2811 relative to north is indicated is the angle 2852. The directional detector system 2800 may determine the azimuthal angle 2851 and the polar angle (not visible since this is a top view) of the source 2899, relative to the drone 2811. The drone 2811 may then determine the angle of the source 2899 relative to true north by adding the orientation angle 2852 to the azimuthal angle 2851. The drone 2811 may also calculate the horizontal distance 2853 of the source 2899 from the drone 2811 according to the altitude of the drone 2811 and the tangent of the polar angle. Then, using the GPS coordinates of the drone 2811, the true bearing of the source, and the distance 2853 of the source 2899, the drone 2811 can thereby determine the geographical coordinates of the source.

Embodiments of the systems disclosed herein can provide many advantages for rapid detection and localization of radiation sources. Embodiments can: (a) determine both the azimuthal angle and polar angle of the source relative to the system, thereby locating the source in two dimensions; (b) determine the source direction using only a single acquisition of detector data at a single orientation of the system, thereby avoiding extensive iteration and rotations; (c) provide high-resolution azimuthal and polar angle determinations for source angles throughout the front half-sphere from the detector axis to the midplane and, with the addition of a back detector, can cover the entire $4\pi$ sphere; (d) determine when the detector axis is aligned with the source by comparing the side detector signals; (e) provide high detection efficiency at low system weight due to the lack of shields and collimators; (f) detect gamma rays, fast neutrons, or slow neutrons by substituting appropriate detector materials; (g) acquire images of the inspection scene and overlay an icon on the image at the source location; and (h) be compact, economical, easy to build, easy to use, and require no exotic/rare/expensive materials. Embodiments may be well-suited for critically important security applications including as a portable survey instrument, a walk-through portal, a fixed-site cargo and vehicle scanner, a mobile area scanner for concealed weapons, an airborne directional radiation sensor, and a two-dimensional room monitor for radiation as well as many others. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A system for detecting and locating a radioactive source, comprising:
   three or more side detectors positioned symmetrically around a detector axis that extends centrally from the back to the front of the system, each side detector configured to emit signals upon detecting particles from the radioactive source, and to block at least 50% of the particles orthogonally incident thereon;
   a slab-shaped front detector positioned frontward of the side detectors, orthogonal to the detector axis, and configured to emit signals upon detecting particles from the radioactive source, wherein the thickness of the front detector is at most 0.5 times the average interaction distance of the particles in the front detector, and the lateral dimensions of the front detector are at least 2 times the average interaction distance of the particles in the front detector; and
   a processor configured to receive the signals and to execute instructions stored in non-transient computer-readable media, wherein the instructions include calculating the azimuthal angle of the radioactive source by interpolating detection data of the side detectors, calculating a numerator according to the detection data of the side detectors, calculating a ratio equal to the numerator divided by detection data of the front detector, and comparing the ratio to a predetermined angular correlation function that provides an estimate of the polar angle of the radioactive source.

2. The system of claim 1, wherein the numerator is the highest detection rate of the side detectors, plus a geometrical factor times the second-highest detection rate of the side detectors, wherein the geometrical factor is between 0.05 and 0.2.

3. The system of claim 1, wherein the numerator is the highest differential of the side detectors, plus a geometrical factor times the second-highest differential of the side detectors, wherein the geometrical factor is between 0.05 and 0.2, and each differential equals detection data of a respective one of the side detectors minus detection data of the diametrically opposite side detector, respectively.

4. The system of claim 1, wherein the numerator is the sum of the detection data of all the side detectors.

5. The system of claim 1, wherein the system further includes a back detector comprising a slab configured to emit signals upon detecting the particles, positioned behind the side detectors, and oriented perpendicular to the detector axis.

6. The system of claim 5, wherein the lateral dimensions of the back detector are at least four times the thickness of the back detector.

7. The system of claim 6, wherein the processor is configured to determine whether the source is in front of or behind the system by comparing the particle detection rate of the front detector with the particle detection rate of the back detector.

8. The system of claim 1, further comprising a camera configured to produce an image of an inspection scene, and wherein the processor is configured to indicate the location of the source by placing an indicator on the image according to the calculated azimuthal and polar angles of the source.

9. The system of claim 8, wherein the indicator has an elliptical shape, wherein the axes of the elliptical shape are configured to indicate the uncertainties in the azimuthal and polar angles.

10. The system of claim 9, wherein the camera is further configured to arrange the image so that the source location is centered on the image.

11. The system of claim 1, further including a wearable personal safety device configured to transmit a message when an operator of the system falls down.

12. The system of claim 1, wherein the front detector comprises N front detector portions, each front detector portion comprising a slab positioned orthogonal to the detector axis and frontward of the side detectors, N being the number of side detectors.

13. The system of claim 12, wherein the processor is configured to calculate the detection data of the front detector by adding together the detection data of the N front detector portions.

14. The system of claim 12, further comprising N sensors, each sensor being configured to receive light pulses from exactly one of the side detectors and exactly one of the front detector portions, respectively.

15. The system of claim 12, wherein each front detector portion is optically coupled to exactly one of the side detectors respectively, and each side detector is optically coupled to exactly one of the front detector portions respectively.

16. The system of claim 15, further comprising N back detector portions, each back detector portion comprising a slab-shaped body configured to emit signals upon detecting the particles, positioned behind the side detectors, and oriented perpendicular to the detector axis, wherein each back detector portion is optically coupled to exactly one of the side detectors respectively, and each side detector is optically coupled to exactly one of the back detector portions respectively.

17. The system of claim 16, wherein the front detector portions comprise a first scintillator type, the side detectors comprise a second scintillator type different from the first scintillator type, and the back detector portions comprise a third scintillator type different from the first and second scintillator types.

18. The system of claim 1, further including a remotely-operated unoccupied airborne vehicle configured to fly above an inspection region and to determine the azimuthal and polar angles, relative to the remotely-operated unoccupied airborne vehicle, of the radioactive source in the inspection region.

19. The system of claim 1, further including a passageway through which pedestrians can pass, wherein the system is configured to determine the location of a moving source at a plurality of successive times.

20. The system of claim 1, wherein the front detector and the side detectors are all enclosed in a single hermetic enclosure, and the processor is configured to determine a particle energy by adding together signals from the front detector and all of the side detectors.

* * * * *